(12) United States Patent
Atalar et al.

(10) Patent No.: US 12,019,160 B2
(45) Date of Patent: Jun. 25, 2024

(54) MECHANICALLY RESONANT PHOTOELASTIC MODULATOR FOR TIME-OF-FLIGHT IMAGING

(71) Applicant: The Board of Trustees of the Leland Stanford Junior University, Stanford, CA (US)

(72) Inventors: Okan Atalar, Palo Alto, CA (US); Amir H. Safavi-Naeini, Palo Alto, CA (US); Mohammad Amin Arbabian, San Francisco, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 916 days.

(21) Appl. No.: 16/971,127

(22) PCT Filed: Apr. 19, 2019

(86) PCT No.: PCT/US2019/028345
§ 371 (c)(1),
(2) Date: Aug. 19, 2020

(87) PCT Pub. No.: WO2019/204744
PCT Pub. Date: Oct. 24, 2019

(65) Prior Publication Data
US 2021/0109223 A1 Apr. 15, 2021

Related U.S. Application Data

(60) Provisional application No. 62/750,534, filed on Oct. 25, 2018, provisional application No. 62/659,871, filed on Apr. 19, 2018.

(51) Int. Cl.
*G01S 17/894* (2020.01)
*G01S 7/481* (2006.01)
(Continued)

(52) U.S. Cl.
CPC .......... *G01S 17/894* (2020.01); *G01S 7/4816* (2013.01); *G01S 17/32* (2013.01); *G01S 17/58* (2013.01)

(58) Field of Classification Search
None
See application file for complete search history.

(56) References Cited

U.S. PATENT DOCUMENTS 3,655,265 A * 4/1972 Hammond ................ G02F 1/11
359/313
5,422,966 A 6/1995 Gopalakrishnan
(Continued)

FOREIGN PATENT DOCUMENTS

WO WO-9428452 A1 * 12/1994 ................ G01J 5/44
WO WO1994028452 12/1994

OTHER PUBLICATIONS

Schwarte et al., "New electro-optical mixing and correlating sensor: facilities and applications of the photonic mixer device (PMD)", 1997, SPIE v3100, 245.
(Continued)

*Primary Examiner* — Luke D Ratcliffe
(74) *Attorney, Agent, or Firm* — LUMEN PATENT FIRM

(57) ABSTRACT

An optical modulator with a wide aperture, high acceptance angle, low required drive voltages and high operating frequency is provided. The modulator relies on the photoelastic effect and makes use of mechanical resonance in order to improve efficiency. The acoustic excitation and optical propagation path are nominally co-aligned, so the required symmetry breaking is provided by having the modulator material be optically and/or mechanically anisotropic. Such a modulator can be used to enable efficient and low-cost per-pixel optical ranging and speed sensing.

18 Claims, 12 Drawing Sheets

(51) Int. Cl.
*G01S 17/32* (2020.01)
*G01S 17/58* (2006.01)

(56) References Cited

U.S. PATENT DOCUMENTS

| | | | |
|---|---|---|---|
| 6,057,909 | A | 5/2000 | Yahav |
| 6,282,010 | B1 * | 8/2001 | Sulzbach .......... G02F 1/133502 |
| | | | 359/321 |
| 6,825,455 | B1 | 11/2004 | Schwarte |
| 6,970,278 | B1 | 11/2005 | Buican |
| 8,983,240 | B2 * | 3/2015 | Schalberger .............. G02F 1/13 |
| | | | 385/3 |
| 2006/0227316 | A1 | 10/2006 | Gatt |

OTHER PUBLICATIONS

Lange et al., "Solid-State Time-of-Flight Range Camera", 2001, IEEE JQE v37n3, 390.

Jongenelen et al., "Maximizing Precision Over Extended Unambiguous Range for TOF Range Imaging Systems", 2010, IEEE.

Payne et al., "Characterizing an Image Intensifier in a Full-Field Range Imaging System", 2008, IEEE Sensors Journal v8n11, 1763.

Kawakita et al., "High-definition real-time depth-mapping TV camera: HDTV Axi-Vision Camera", 2004, Optice Express v12n12, 2781.

Park et al., "Three-dimensional imaging using fast micromachined electro-absorptive shutter", J. Micro/Nanolith. MEMS MOEMS 12(2), 023011.

Wheaton et al., "Open architecture time of flight 3D SWIR camera operating at 150 MHz modulation frequency", 2017, Optics Express v25n16, 19291.

Bammer et al., "A single crystal photo-elastic-modulator", 2007, SPIE v6469.

Zhao et al., "Study on Signal Crystal Photo-Elastic Modulator Based on Lithium Niobate Piezoelectric and Photo-Elastic Effect", 2012, IEEE.

* cited by examiner

MECHANICALLY RESONANT PHOTOELASTIC MODULATOR FOR TIME-OF-FLIGHT IMAGING

FIELD OF THE INVENTION

This invention relates to optical modulators, especially in connection with distance and velocity imaging.

BACKGROUND

Various methods have been proposed to provide optical distance and velocity imaging, which can be regarded as per-pixel optical Doppler radar. One such approach is a double modulation scheme, where source and receiver are both modulated and the signals of interest are low frequency heterodyne beats. However, receiver modulators that have been proposed for such systems to date suffer from various disadvantages. Accordingly, it would be an advance in the art to provide receiver modulators suitable for such systems.

SUMMARY

An optical modulator with a wide aperture, high acceptance angle, low required drive voltages and high operating frequency is provided. The modulator relies on the photoelastic effect and makes use of mechanical resonance in order to improve efficiency. The acoustic excitation and optical propagation path are nominally co-aligned, so the required symmetry breaking is provided by having the modulator material be optically and/or mechanically anisotropic. Such a modulator can be used to enable efficient and low-cost per-pixel optical ranging and speed sensing.

Applications include but are not limited to science, tracking, and robotics. A major application of this system is for autonomy, where a low-cost and complexity perception module as proposed here can provide situational awareness, imaging, and possibly localization using prior maps. The system can also assist other imaging systems to detect object features with high range and depth resolution and providing tracking capability. The system uses a combination of optical techniques with signal processing methods to allow for tracking and localization of number of targets in a scene (assuming that the scene is not very complex). It could have applications in scientific discovery, indoor tracking of objects (in low complexity scenes), long range detection or other related applications. Combination with hyper-spectral techniques, as described in the invention and with minimal additional hardware, can be used to further differentiate and identify targets in various lighting and environmental conditions.

Possible variations include: Spectral interference filter(s) can be placed in front of the light source and/or receiver to narrow the spectral width of the source and reject ambient noise from the environment at the cost of increased driving power for the optical source(s). The intensity modulation of the optical source(s) in the transmitter side can be done by several different methods, including: modulation of the current, a polarization interferometer at the transmitting chain similar to the one used for the receiver. The system can also be operated in the homodyne mode by having the intensity modulation frequency of the optical source equal to the demodulation frequency used in the polarization modulator.

In a particular embodiment, a photoelastic window can be used for the polarization modulator. Driving the photoelastic window near its acoustic resonance frequency modulates the polarization of light passing through the window at the applied drive frequency. Multiple such materials with same/different acoustic resonances can be used/stacked for multi-frequency operation. The acoustic resonance frequencies of the photoelastic window used for polarization modulation can be designed to match the optical intensity modulation frequencies of the optical source used to illuminate the scene and have beat frequencies that fall to desired regions in the optical bandwidth of the image sensor. Transparent electrodes can be used for the longitudinal mode operation possibly also with anti-reflection coatings.

A key feature of this work is the use of a polarization interferometer in the receiver chain to determine velocity, depth, spectral information (color) by intensity modulating the received beam from the scene. This effectively performs as a downconverter of the intensity modulated optical source in the transmitter to be recorded and processed by an image sensor.

DETAILED DESCRIPTION

Section A describes general principles relating to various embodiments of the invention. Section B provides a detailed description of some exemplary embodiments of the invention.

A) General Principles

Figure 1A:
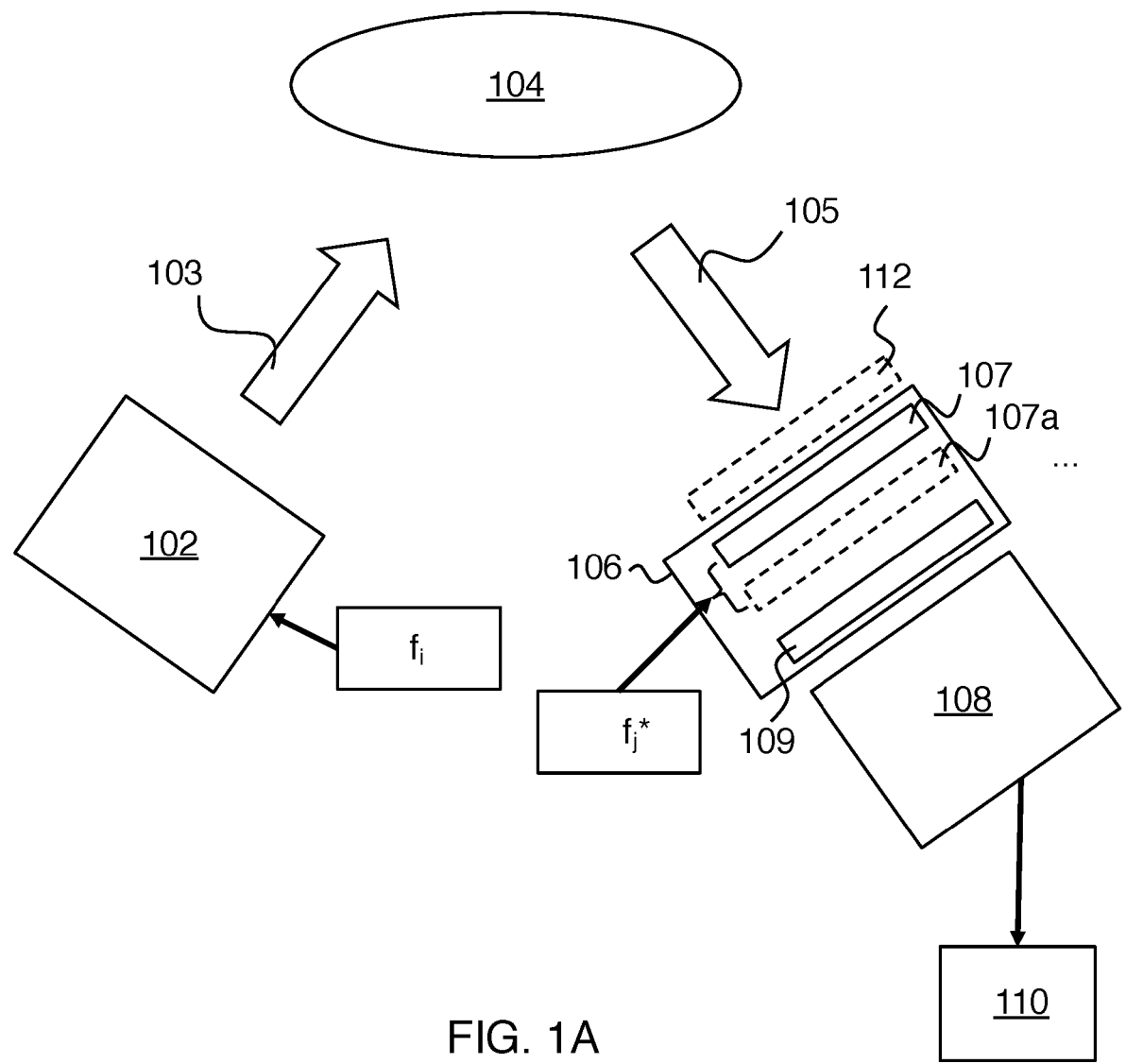
FIGS. 1A-B schematically show operation of a heterodyne optical ranging system.

FIG. 1A shows operation of a lidar system based on a free space optical mixer according to principles of this work. An optical source 102 is configured to illuminate at least one target 104 with source light 103 that is intensity modulated at one or more source modulation frequencies $f_j$. Source modulation frequencies are preferably in a range from 500 kHz to 500 MHz. Here we define optical radiation as electromagnetic radiation having a free space wavelength in a range from 100 nm to 15 μm. Any kind of optical source can be employed, such as a laser or light emitting diode (LED). Light 105 from the target(s) is imaged onto an imaging detector array 108 by optics (not shown) configured to form an image of the target(s) on the imaging detector array. The imaging optics aren't shown here because they are wholly conventional. Any kind of imaging detector array can be used, such as CMOS (complementary metal-oxide-semiconductor) image sensors and CCD (charge-coupled device) image sensors.

Figure 1B:
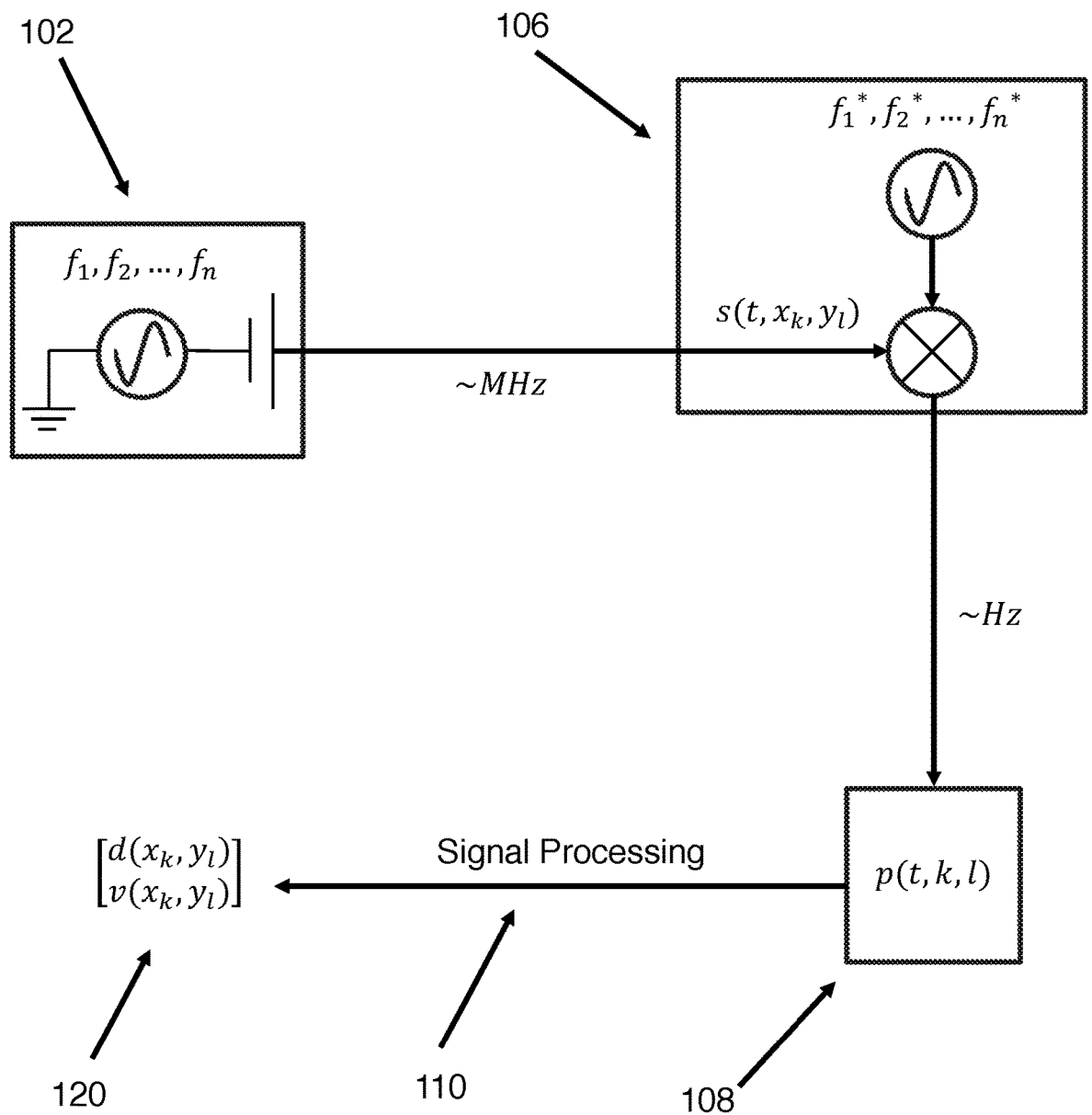
Figure 2A:
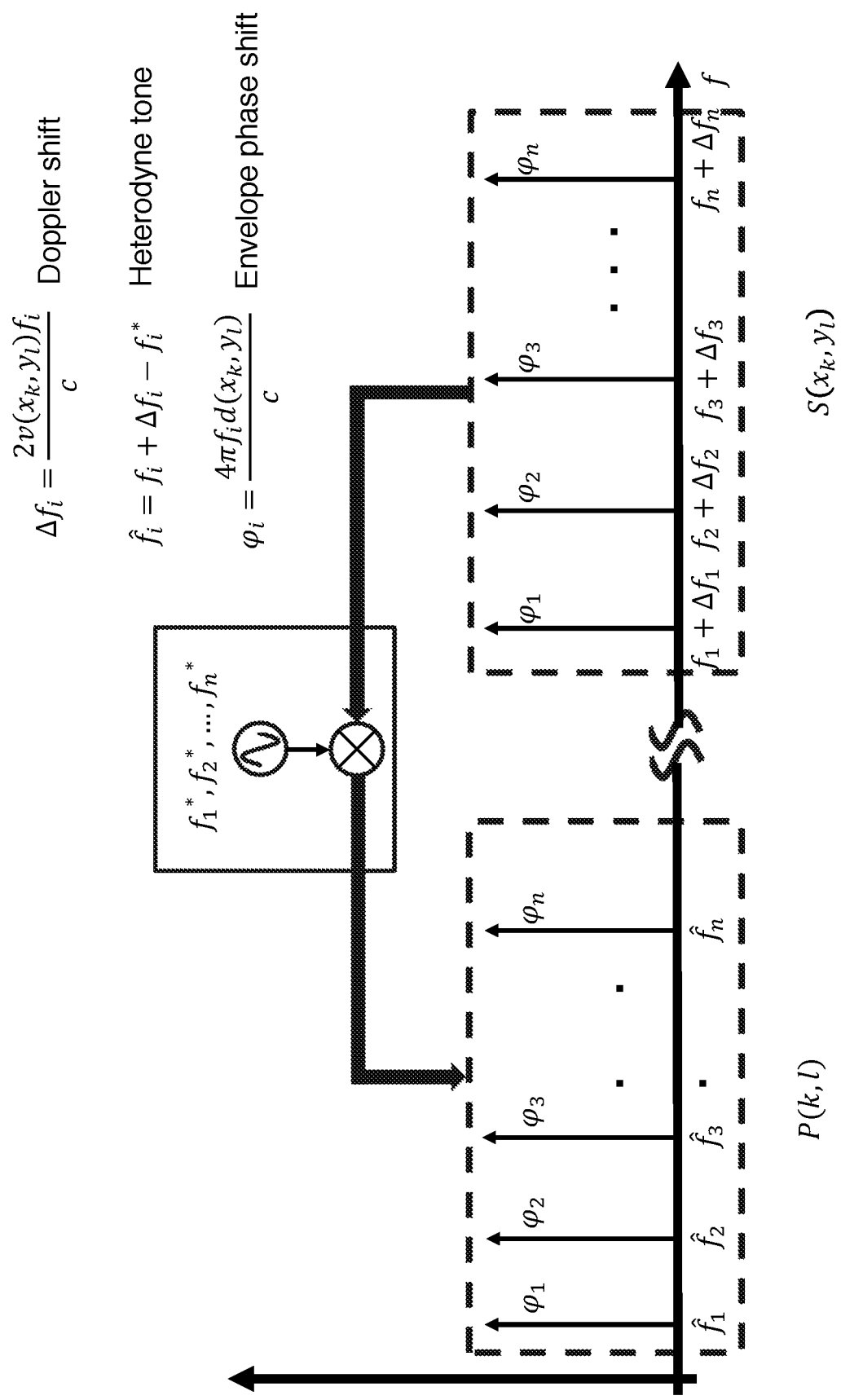
FIG. 2A shows frequency translation in the system on FIGS. 1A-B

The system also includes a receiver modulator 106 that is modulated at one or more receiver modulation frequencies $f_j^*$ to provide intensity modulation of light 105. Receiver modulation frequencies are preferably in a range from 500 kHz to 500 MHz. Details within block 106 are described below. The effect of this double modulation scheme is shown on FIG. 1B. The signals of interest at detector array 108 are low frequency heterodyne signals at frequencies $|f_i - f_i^*|$. Processor 110 can determine per-pixel distances and velocities 120. FIG. 2A is another view of the same frequency shift concept. Note that the envelope phase shifts are translated to lower frequencies without being changed, which enables optical ranging using the heterodyne signals. Moving objects in the target(s) will lead to Doppler shifts in frequency, and these Doppler frequency shifts are also translated to lower frequencies without being changed. This enables velocity imaging.

Figure 2B:
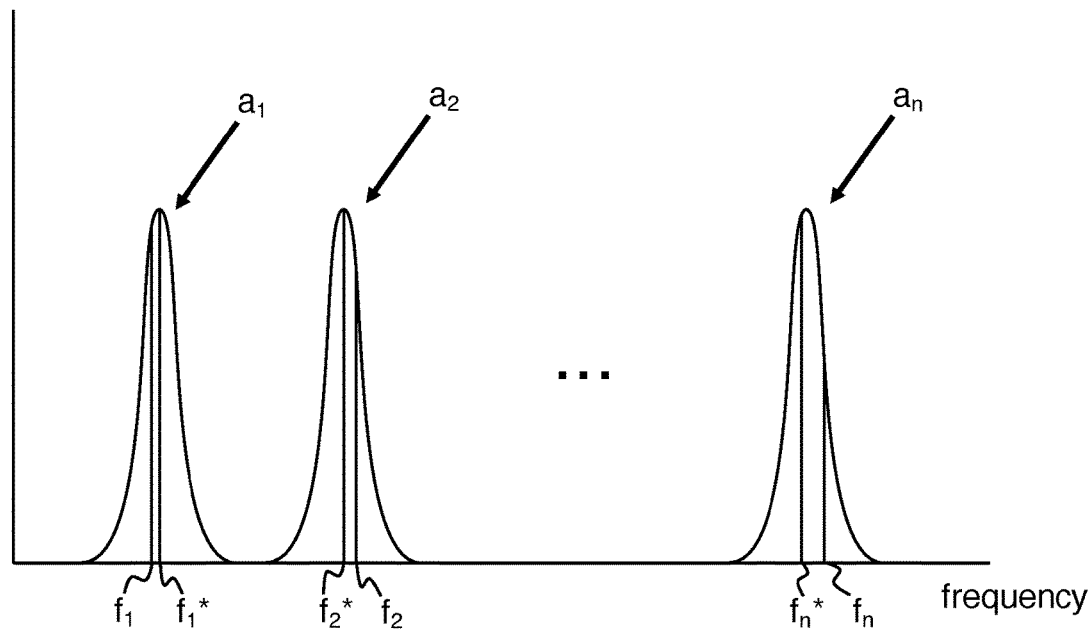
FIG. 2B shows a preferred alignment of modulation frequencies with acoustic resonances.

Importantly, modulator 106 is an opto-mechanical device having one or more mechanical resonances $a_1$, $a_2$, etc. as shown on FIG. 2B. Preferably, as shown on FIG. 2B, receiver modulation frequencies are chosen such that these frequencies are at or near the frequencies of corresponding acoustic resonances. It is also preferred, as shown, for the source modulation frequencies to be chosen such that each source modulation frequency has a corresponding nearby receiver modulation frequency. Finally, it is preferred, as shown, for the differences between each pair of corresponding source and receiver frequencies to be distinct. The purpose here is to recover distinct heterodyne signals from each pair of source/receiver frequencies, while ensuring that cross terms from other frequency combinations are out of band for the receiver. Preferably these acoustic resonances are in a range from 500 kHz to 500 MHz. Throughout this work, acoustic excitation, resonance etc. and mechanical excitation, resonance etc. are regarded as being synonymous terms.

A mechanical resonance among $a_1$, $a_2$, etc. can be excited and the intensity modulation frequency for the source light 103 could be equal to the excited mechanical resonance frequency. A homodyne measurement can be performed in this case. Sequential homodyne measurements can be performed for the different mechanical resonance frequencies (where the intensity modulation frequency is equal to the mechanical resonance frequency for each measurement) as an alternative to simultaneous multi-frequency heterodyne measurements. Sequential heterodyne measurements could also be performed, where one of the mechanical resonances is excited and the intensity modulation frequency for source light 103 is at a single frequency and slightly different from the mechanical resonance frequency excited.

Figure 3A:
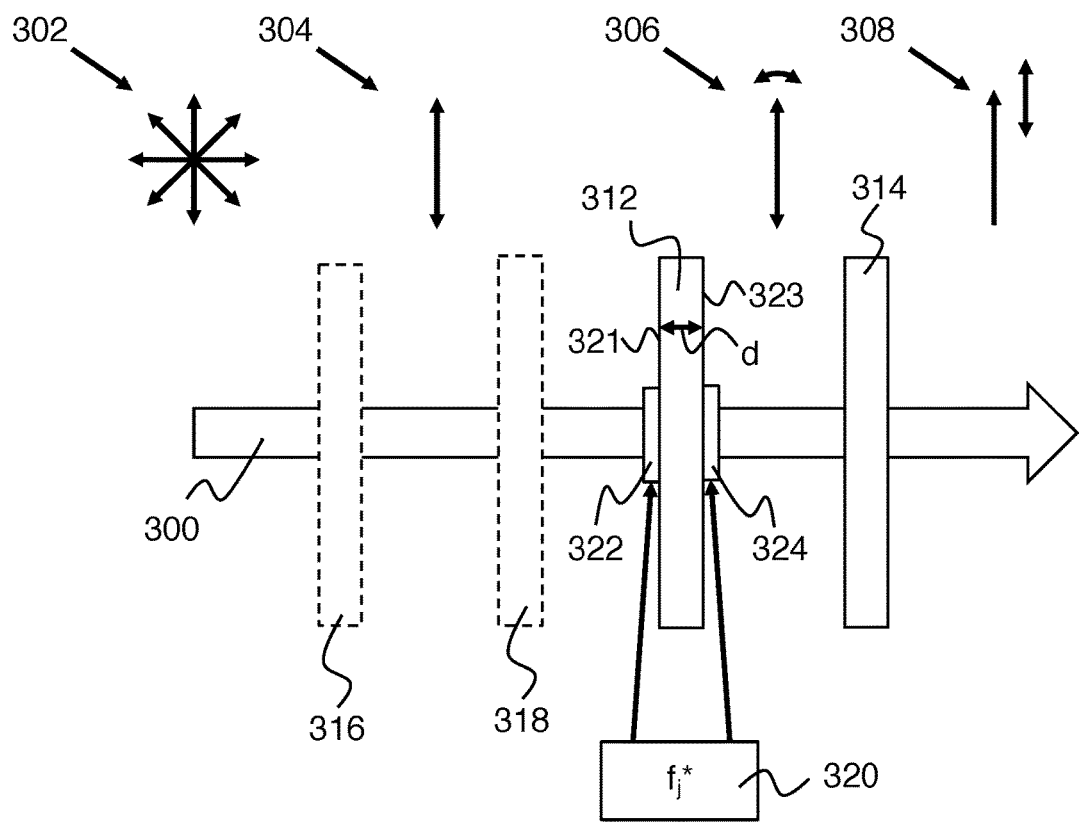
FIG. 3A shows a polarization modulator according to principles of this work.

As described in greater detail below, the requirements for large aperture, high acceptance angle, low drive voltage and high modulation frequency place constraints on the design of modulator 106 that are addressed with a new modulator architecture. FIG. 3A shows an example of this approach. Here 302, 304, 306, 308 schematically show the state of light beam 300 as it passes through the optical elements of the modulator.

Here element 312 is the core of the modulator. This element is made of a photoelastic material configured as a photoelastic window 312 having a thickness d separating first and second window surfaces 321 and 323, and having lateral dimensions substantially greater than d. Here the window having lateral dimensions substantially greater than thickness d means lateral dimensions are preferably 5 d or greater, and more preferably the lateral dimensions are 10 d or greater. The window thickness is preferably 4 mm or less. A first acoustic excitation structure 322 is disposed on the first window surface 321. Optionally, a second acoustic excitation structure 324 is disposed on the second window surface 323. These acoustic excitation structures can be electrodes and/or acoustic transducers.

A controller 320 is connected to the first and second acoustic excitation structures 322 and 324 and is configured to excite one or more acoustic resonances having resonant frequencies determined by d (FIG. 2B). The optical path through the photoelastic window 312 is substantially perpendicular to the first and second window surfaces. Substantially perpendicular means perpendicular to within +/−10 degrees. Light passing through the photoelastic window 312 and propagating substantially along the optical path experiences a time-varying birefringence responsive to excitation of the one or more acoustic resonances to provide polarization-modulated output light. This amounts to providing a polarization modulation of incident light, e.g., changing the linear polarization of 304 to a more variable state of polarization schematically shown by 306.

Here light propagates substantially along an optical path if its angle of deviation from that path is 40 degrees or less. The acceptance angle for the photoelastic modulator depends on the thickness of the photoelastic window (assuming it is birefringent). The acceptance angle is approximately plus or minus 40 degrees for a lithium niobate wafer thickness of 100 μm. This is one of the advantages of this modulation scheme compared with other methods. Since the device relies on acoustic resonance rather than optical resonance (e.g. Fabry-Perot Interferometer), the acceptance angle is very large.

In most cases, photoelastic window 312 is followed by a polarizer 314 in order to convert polarization modulation 306 into intensity modulation 308.

The polarization modulator can optionally include an input polarizer 316 to convert an unpolarized state 302 to a polarized state 304. Such an input polarizer is not needed if source 102 provide polarized light to the target(s) 104 and the target(s) do not significantly affect the state of polarization. In cases where an input polarizer is used, it is preferred for it to provide an input state of polarization to the photoelastic window that substantially equally excites two polarization modes of the photoelastic window.

The physical effect relied upon in this work is a variable retardance induced in the photoelastic window by an acoustic excitation in a longitudinal excitation geometry (i.e., optical and acoustic paths substantially aligned). In order for this variable retardance effect to occur, there must be a symmetry breaking in the apparatus. This symmetry breaking can be mechanical and/or optical. A suitable mechanical asymmetry can arise from a crystal structure in which a longitudinal acoustic wave will generate a variable retardance because of the mechanical anisotropy of the crystal. Similarly, a suitable optical asymmetry can arise when light propagating through the photoelastic window experiences (a static) birefringence to break the symmetry and allow the device to function as a controllable wave plate.

Light passing through the photoelastic window and propagating along the optical path can experience a static birefringence in the absence of any acoustic excitation. Preferably a compensating window 318 is disposed parallel to the photoelastic window 312 to mitigate the effect of the static birefringence on the acceptance angle of the device. Retardance is the phase shift between the two polarization modes on passage through a birefringent window. Preferably the retardances of the photoelastic window and compensating window net out to a substantially 90 degree (i.e., +/−60-120 degrees) retardance. The sign of this net retardance does not matter. Here it is preferred to account for multiples of $2\pi$ in the retardances and net the difference out to 90 degrees (as opposed to 90 degrees plus an integer multiple of $2\pi$).

In conventional photoelastic modulators, the transverse acoustic input provides the required symmetry breaking. But here the longitudinal acoustic input does not break the symmetry as needed. Accordingly, the optical path through the window (i.e., along the surface normal of the two surfaces of the window) should not coincide with an optical axis of the window, for designs having static birefringence. A uniaxial material has one such optical axis, while biaxial materials have two such optical axes. Preferably the crystal cut of the window is optimized to maximize its controllable wave plate behavior. Furthermore if light experiences birefringence as it passes through the window, the input polarization to the window is preferably such as to excite both polarization modes of the window, preferably substantially equally (i.e., mode intensities equal within +/−50%). For example, the input polarization could be linear at a 45 degree angle with respect to the relevant axes of the crystal coordinate system.

Alternatively, light passing through the photoelastic window and propagating along the optical path can experience isotropic propagation in the absence of any acoustic excitation. In such cases, it is also preferred for a compensating window 318 to be disposed parallel to the photoelastic window 312. However, here the compensating window 318 preferably has a retardance of substantially 90 degrees. In this situation, the photoelastic material of window 312 is mechanically anisotropic to provide the required symmetry breaking.

Figure 3B:
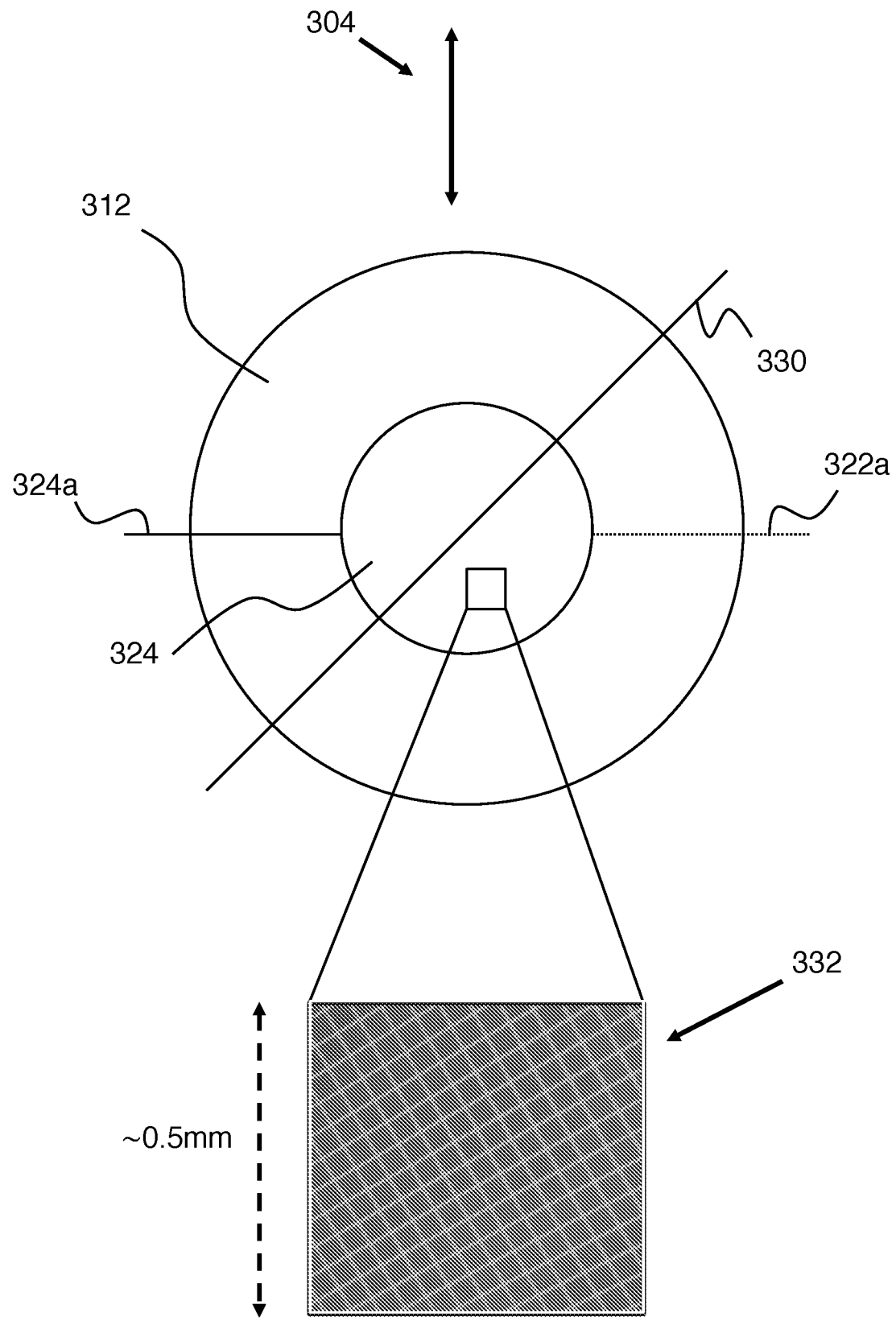
FIG. 3B is an end-view of an exemplary photoelastic modulator element.

The photoelastic window 312 can also be piezoelectric. In this case the first and second excitation structures can be electrodes configured to excite the acoustic resonances via the piezoelectric effect in the photoelastic window. FIG. 3B shows an exemplary end view of 312 of FIG. 3A. Here window 312 is made of lithium niobate, so acoustic excitation structures 322 and 324 are electrodes disposed in the optical path of the device. Transparency of the electrodes is provided by making them wire mesh electrodes, as shown by image 332. Here 322a and 324a are connections to electrodes 322 and 324, and 304 schematically shows the incident state of polarization relative to optic axis 330 of window 312.

In cases where photoelastic window 312 is not piezoelectric, one or more acoustic transducers can be configured to excite the acoustic resonances. In such cases, 324 on FIG. 3A is optional, since a single acoustic transducer can suffice to provide the required excitation. Alternatively, 324 on FIG. 3A can be present with 322 omitted (i.e., for single acoustic transducer embodiments, it does not matter which side of the window the transducer is on).

It is preferred for the first and/or second excitation structures to be transparent, either by being fabricated of transparent materials like indium tin oxide, or by being configured as a wire mesh electrode. Any photoelastic material can be used for window 312, including lithium niobate. The photoelastic effect is birefringence induced by mechanical stress. All dielectric materials have this property. The crystal family of the photoelastic material is preferably non-cubic (i.e., triclinic, monoclinic, orthorhombic, tetragonal or hexagonal). Here the trigonal and hexagonal lattices are both included in the hexagonal crystal family. Anti-reflection coating(s) can be disposed on the first and/or second window surfaces. The first and/or second window surfaces can be curved to enhance the one or more acoustic resonances, analogous to how an optical laser mode is formed in an optical cavity with curved mirrors.

Returning now to FIG. 1A, an exemplary system for providing simultaneous optical distance and/or speed measurements of at least one target includes source 102 and imaging detector array 108 as described above. Receiver modulator 106 includes one or more polarization modulators 107, 107a, . . . as described above, followed by an output polarizer 109 configured to convert the polarization-modulated output light into intensity modulated output light. In cases where there are multiple receiver modulation frequencies, all frequencies can be applied to a single polarization modulator 107, or each frequency can be applied individually to a corresponding polarization modulator 107, 107a, etc. Any intermediate partitioning of frequencies among the polarization modulators is also possible.

Imaging detector array 108 has an electrical bandwidth B such that the imaging detector array is non-responsive to signals having frequency greater than B. The source modulation frequencies and the receiver modulation frequencies are selected such that each source modulation frequency has a corresponding receiver modulation frequency for i=j. Modulation cross terms for i=j have distinguishable frequencies less than B, and modulation cross terms for i≠j have frequencies greater than B. Each receiver modulation frequency $f_j^*$ also has a corresponding acoustic resonance $a_j$ (e.g., as shown on FIG. 2B). For the optical ranging application, it is important that the cross terms for i≠j in the frequency shifting be out of band of the detector array. If the natural electrical bandwidth of the detector array does not inherently provide a suitable bandwidth, low pass electrical filtering can be used to ensure clean rejection of the cross terms for i≠j.

The system can further include a processor 110 configured to determine distance and/or speed (120 on FIG. 1B) of the at least one target from analysis of received Doppler frequency shifts and/or phase shifts of modulation envelopes at one or more beat frequencies $|f_i-f_i^*|$ of the intensity modulated output light. The distance and/or speed can be determined individually for one or more pixels of the imaging detector array. A preferred distance range for distance/speed ranging is 0-200 m.

The system can also further include a bandpass spectral filter 112 configured to selectively pass light having the source wavelength and disposed to filter the image.

B) Detailed Example

B1) Introduction

The human visual system and standard image sensors form high-resolution images of their surroundings. These systems are effective in forming images of the surrounding scene but do not provide accurate estimates of depth. Many applications, however, rely on accurate depth images in a scene, including machine vision, tracking, autonomous vehicles and robotics. The need for generating accurate depth images in a scene necessitates new generation of image sensors.

Depth imaging in a scene can be achieved through the ToF (time of flight) imaging technique. A scene is illuminated with a controlled light source and the interaction of this light with the scene is captured and processed for estimating the depth in the scene. The most basic method for ToF imaging involves sending a focused beam of light pulse to a particular location in a scene and measuring the time delay of the returned pulse to the optical detector. Scanning the beam allows depth images to be generated. Scanning of the beam can be realized through mechanical scanning or non-mechanical scanning (solid state). Non-mechanical scanning usually uses optical phased arrays with full control of the phase and frequency of a laser beam, although recently solid state optomechanical steering has also been proposed. An alternative method, usually referred to as flash lidar, captures depth images through illuminating a part of the scene with a modulated light source. Flash lidar avoids scanning the beam by capturing a part of the scene at a single shot, making it a possible low cost, fast and effective way of measuring depth images.

One class of flash lidars operate in time domain by measuring the ToF for each sensor pixel after flashing the scene with a light source. Each point in the scene is focused to a specific image sensor pixel with the use of an optical lens. The ToF for the light to arrive at each sensor pixel is used to determine the distance of each point to the sensor. These flash lidars have high unambiguous range and depth resolution, but are limited by cost or spatial resolution since they require pulsed lasers and specialized pixels with high bandwidths.

Another class of flash lidar sends intensity modulated light to a scene and measures the phase of the reflected light from the scene with respect to the illumination light phase, similar to the operation of stepped frequency continuous wave (SFCW) radar. This technique has also been referred to as radio frequency interferometry (RFI), since light is modulated at typical radar operating frequencies and the envelope of the light is used for estimating distances. To detect distances on the order of meters with sub-meter level depth resolution, megahertz modulation frequencies are used. Standard image sensors do not have the bandwidth to capture the phase of megahertz frequencies. The standard method is to demodulate the incoming megahertz frequency to a lower frequency before sampling, similar to the working principle of a superheterodyne receiver.

State of the art phase-shift based ToF imaging sensors rely on the photonic mixer device (PMD). Megahertz modulation frequencies are measured by electronic demodulation inside every pixel. These pixels are referred to as demodulation pixels. Homodyne detection is usually used to sample four different phases for the illumination. Since phase is measured, there is an ambiguity in the distance when a single frequency is used, and there is a trade-off between unambiguous range and depth resolution due to the intensity modulation frequency selected. To significantly improve the unambiguous range while retaining the depth resolution, the phase of light at multiple intensity modulation frequencies can be measured, and signal processing techniques similar to SFCW radar can be used.

The ToF camera using PMD technology or similar architectures use an image sensor with specialized pixels, limiting the spatial resolution. Since these systems use non-standard image sensors, they are expensive. Additionally, detecting multiple frequencies simultaneously requires multi-heterodyne detection, and this requires increasingly complex "smart pixels" with large sizes, leading to large image pixels and therefore reducing spatial resolution. Standard ToF cameras measure the phase at each frequency by stepping the frequency and measuring the phase, increasing the measurement time.

One possible way of measuring the phase of the incoming light modulated at megahertz frequency with a standard image sensor per pixel is by using an optical mixer (also referred to as an optical shutter) in front of the sensor to downconvert the high frequency to a lower beat tone (heterodyne detection). The system level architecture of this kind of ToF imaging system is demonstrated in FIGS. 1A-B, which shows the three main components of the ToF imaging system: modulated light source 102, free-space optical mixer 106, and the CMOS image sensor 108. Such an architecture would allow the use of the most advanced state of the art image sensors, which are low cost and have high spatial resolution. Such an architecture, however, ideally requires a free-space optical mixer with wide acceptance angle, low cost, low power consumption, and centimeter level aperture to be placed in front of the image sensor for performing the heterodyne detection. The function of the optical mixer is shown in FIG. 2A, in which the megahertz level intensity modulated light reflected from the scene is downconverted by the optical mixer to hertz level beat tones. This allows the image sensor to detect the beat tones, which are used to estimate distance and velocity in the scene using signal processing techniques.

There have been previous attempts in designing a free-space optical mixer, however, all of these approaches have one or more drawbacks. A mechanical shutter is not practical since megahertz modulation frequencies requires extremely high rotation speeds, and this method has reliability issues due to moving parts. An image intensifier can be used for demodulation, however, the image intensifier is large in size and requires high operating voltages. Pockels cell sandwiched between polarizers can be used, but Pockels cells with centimeter level apertures are large and have prohibitively high half-wave modulation voltages. Electro-absorption in multiple quantum well using an optical cavity can be used to modulate light, but this approach has a narrow acceptance angle for light due to the use of an optical cavity in the modulator. Stepped quantum well modulator (SQM) has also been used to modulate light, but this design has limited aperture (~1 mm) and uses a microscope objective to focus the received light from the scene onto the surface of the SQM.

To design a free-space optical mixer with low half-wave modulation voltage, a resonant device is required. We avoid using an optical cavity since an optical cavity has a narrow acceptance angle for light, so we instead use an acoustic cavity.

In this work, we demonstrate the working principle of a prototype phase-shift based ToF imaging system with a standard CMOS image sensor using a resonant photoelastic modulator. Part of a scene is illuminated with intensity modulated light and the reflected light from the scene is downconverted by an optical mixer and then imaged on a CMOS image sensor. The optical mixer includes a photoelastic modulator sandwiched between polarizers. The photoelastic modulator of this example is a 0.5 mm thick and 5.08 cm diameter Y-cut lithium niobate wafer with transparent surface electrodes. The photoelastic modulator modulates the polarization of light by operating the lithium niobate wafer at its mechanical resonance modes. To demonstrate proof of concept, light of wavelength 630 nm is intensity modulated at two frequencies and downconverted by the optical mixer such that the two beat tones fall within the bandwidth of the image sensor. We demonstrate the detection of two beat tones using heterodyne detection with a CMOS image sensor. This opens the way for simultaneous multifrequency operation which can play a critical role as a flash lidar for various applications.

B2) Polarization Modulation by Photoelastic Effect

In this section, the applied voltage to the photoelastic modulator will be related to the change in the polarization state of light passing through the modulator. The polarization modulation will be determined by calculating the modulated index ellipsoid for the photoelastic modulator. The index ellipsoid relates the refractive index to the electric field direction of light (polarization). The index ellipsoid can be modulated by using the photoelastic effect, therefore modulating the refractive indices for different polarization states. Using the piezoelectric effect, strain can be generated in a wafer to control the polarization state of light electronically by modulating the index ellipsoid. The polarization modulation should be such that the two in-plane refractive indices for the wafer are modulated by different amounts to result in an in-plane polarization rotation for light propagating perpendicularly to the wafer.

Photoelastic modulators are used commercially to control the polarization state of light, but they generally use a nonpiezoelectric and isotropic material. Piezoelectric transducers are used to generate strain in the sample, which travels perpendicularly to the propagation direction of light through the modulator. This configuration breaks in-plane symmetry and leads to in-plane polarization modulation. The fundamental mechanical resonance frequencies for these devices are usually in the kilohertz range due to the centimeter scale optical aperture of the modulator. Higher order mechanical modes can be used to drive the modulator, but as the mode order increases, the volume average for strain in the sample decreases due to the varying sign of the strain in the sample. Therefore, photoelastic modulators that generate strain traveling perpendicularly to the propagation direction of light and having centimeter scale apertures usually operate at kilohertz mechanical frequencies, limiting the depth resolution of an imaging system.

To achieve megahertz mechanical resonance frequencies and square-centimeter-level apertures with high modulation efficiency, surface electrodes need to be deposited on the wafer. The surface electrodes generate strain in the sample which travels parallel to the propagation direction of light (normal to the wafer). If a standard wafer of thickness 0.5 mm is used, the fundamental mechanical resonance frequency will appear at roughly 4 MHz for lithium niobate, with resonance frequencies reaching up to 100 MHz (although as the mode order increases, the modulation efficiency drops).

If an isotropic material is used for polarization modulation, generating strain in the material traveling parallel to the propagation direction of light does not result in a change between the in-plane refractive indices due to in-plane symmetry with respect to the excitation. We therefore use a Y-cut lithium niobate wafer as the photoelastic modulator, breaking in-plane symmetry and leading to a net polarization modulation when surface electrodes are used to generate strain in the wafer. Incoming light propagates parallel to the y-axis of the crystal, which is normal to the wafer surface.

Lithium niobate is an anisotropic material, with two different refractive indices corresponding to the two polarization eigenstates. Using a lithium niobate wafer leads to a static polarization rotation for light due to anisotropy. The polarization rotation is different for rays incident on the wafer at different angles. Not correcting for this static birefringence, which depends on the angle the incoming ray makes with the wafer normal, will lead to a limited acceptance angle for the wafer. To correct for this static birefringence, which is standard practice in the design of wave plates, another wafer is placed parallel to the original wafer but rotated in plane by 90°. FIG. 3A demonstrates the polarization modulation by the photoelastic modulator. Here 302, 304, 306, 308 schematically show the state of optical beam 300 as it passes through the optical elements of the modulator. Unpolarized light (302) is polarized (304) after passing through the first polarizer, 316 in FIG. 3A. The polarized light passes through the correcting lithium niobate wafer, element 318 in FIG. 3A, to remove the static polarization part. Polarization state of light is modulated (306) when passing through the photoelastic modulator, element 312 in FIG. 3A. The polarization modulation 306 is converted to intensity modulation 308 after light passes through the output polarizer, element 314 in FIG. 3A.

If the strain profile is uniform or nearly uniform across the cross section of the wafer, to first order a single index ellipsoid can be used to describe the polarization modulation of light as it passes through the wafer. This approximation will be used throughout this section. The unmodulated index ellipsoid for the lithium niobate wafer can be written as in Eq. (1), where $n_o$ and $n_e$ are the ordinary and extraordinary refractive indices of lithium niobate, respectively $$\frac{x^2}{n_0^2} + \frac{y^2}{n_0^2} + \frac{z^2}{n_e^2} = 1 \tag{1}$$

To determine the effective index ellipsoid when strain is generated in the wafer through the piezoelectric effect, the wafer will be separated into infinitesimal volumes which have an infinitesimal thickness dy along the y direction of the crystal and other dimensions equal to the wafer cross-section. Using the strain components, polarization modulation can be determined for each of these infinitesimal volumes using the photoelastic effect.

To first order, the effective index ellipsoid for the wafer is the arithmetic average of the index ellipsoids for these infinitesimal volumes. The effective index ellipsoid can be expressed as in Eq. (2), where $\overline{S}_{ij}$ is the volume average for strain component in the wafer for $(i, j) \in \{x, y, z\}$ and $p_{kl}$ are the photoelastic constants of lithium niobate for $(k,l) \in \{1,2, \ldots, 6\}$.

$$x^2 \left( \frac{1}{n_0^2} + p_{11}\overline{S}_{xx} + p_{12}\overline{S}_{yy} + p_{13}\overline{S}_{zz} + 2p_{14}\overline{S}_{zy} \right) + \tag{2}$$

$$y^2 \left( \frac{1}{n_0^2} + p_{12}\overline{S}_{xx} + p_{11}\overline{S}_{yy} + p_{13}\overline{S}_{zz} - 2p_{14}\overline{S}_{zy} \right) +$$

$$z^2 \left( \frac{1}{n_e^2} + p_{13}\overline{S}_{xx} + p_{13}\overline{S}_{yy} + p_{33}\overline{S}_{zz} \right) +$$

$$2yz(p_{41}\overline{S}_{xx} - p_{41}\overline{S}_{yy} + 2p_{44}\overline{S}_{zy}) +$$

$$2zx(2p_{44}\overline{S}_{xz} + 2p_{41}\overline{S}_{yx}) + + 2xy(2p_{14}\overline{S}_{xz} + (p_{11} - p_{12})\overline{S}_{yx}) = 1$$

We use the volume average of strain for the rest of the calculations. To determine the volume average strain tensor components generated in the lithium niobate wafer when voltage is applied through surface electrodes, we simulate the wafer using the mechanics and piezoelectric modules in COMSOL simulation platform in frequency domain. The relationship between the generated strain and the applied voltage to the wafer can be determined using the piezoelectric equations.

The electrodes only cover half of the surface area of the wafer to limit clamping losses when the wafer is tested experimentally, as schematically shown in FIG. 3B. For megahertz mechanical frequencies at room temperature, clamping losses are usually the dominant loss mechanism. The wafer will be clamped from the sides, therefore only the center part is deposited with aluminum wire grids and the light is passed through this section for polarization modulation.

The strain tensor components are calculated in the frequency domain from (0.1-25) MHz with a frequency stepping of 10 kHz. Since the net polarization rotation of light is important, we calculate the volume average for the strain components. It is seen from COMSOL simulations that $S_{yy}$ and $S_{zy}$ with respect to crystal axis are the strain components which have a significant non-zero volume average for strain. The effective index ellipsoid can therefore be expressed as Eq. (3).

$$x^2\left(\frac{1}{n_0^2} + p_{12}\bar{S}_{yy} + 2p_{14}\bar{S}_{zy}\right) + y^2\left(\frac{1}{n_0^2} + p_{11}\bar{S}_{yy} - 2p_{14}\bar{S}_{zy}\right) + z^2\left(\frac{1}{n_e^2} + p_{13}\bar{S}_{yy}\right) + 2yz(-p_{41}\bar{S}_{yy} + 2p_{44}\bar{S}_{zy}) = 1 \quad (3)$$

We apply a rotation to the yz axis such that the new form is diagonal. Using the coordinate transformations in Eq. (4), Eq. (3) can be transformed into Eq. (5).

$$\begin{aligned}y &= y'\cos(\theta) - z'\sin(\theta) \\ z &= y'\sin(\theta) + z'\cos(\theta)\end{aligned} \quad (4)$$

$$x^2\left(\frac{1}{n_0^2} + p_{12}\bar{S}_{yy} + 2p_{14}\bar{S}_{zy}\right) + y'^2\left(\frac{1}{n_0^2} + p_{11}\bar{S}_{yy} - 2p_{14}\bar{S}_{zy} + (2p_{44}\bar{S}_{zy} - p_{41}\bar{S}_{yy})\tan(\theta)\right) + z'^2\left(\frac{1}{n_e^2} + p_{13}\bar{S}_{yy} + (2p_{44}\bar{S}_{zy} - p_{41}\bar{S}_{yy})\tan(\theta)\right) = 1$$

$$\tan(2\theta) = \frac{4p_{44}\bar{S}_{zy} - 2p_{41}\bar{S}_{yy}}{\left(\frac{1}{n_0^2} + p_{11}\bar{S}_{yy} - 2p_{14}\bar{S}_{zy}\right) - \left(\frac{1}{n_e^2} + p_{13}\bar{S}_{yy}\right)} \quad (5)$$

Since $\tan(\theta)\ll 1$, we neglect the modulations of the y' and z' axis which include the tang term. We assume for our analysis that the beam is incident at an angle $\theta$ to the normal. Since $\theta<1°$ usually, the path traversed by the beam is approximately equal to the thickness of the wafer $$x^2\left(\frac{1}{n_0^2} + p_{12}\bar{S}_{yy} + 2p_{14}\bar{S}_{zy}\right) + y'^2\left(\frac{1}{n_0^2} + p_{11}\bar{S}_{yy} - 2p_{14}\bar{S}_{zy}\right) + z'^2\left(\frac{1}{n_e^2} + p_{13}\bar{S}_{yy}\right) = 1 \quad (6)$$

Figure 4A:
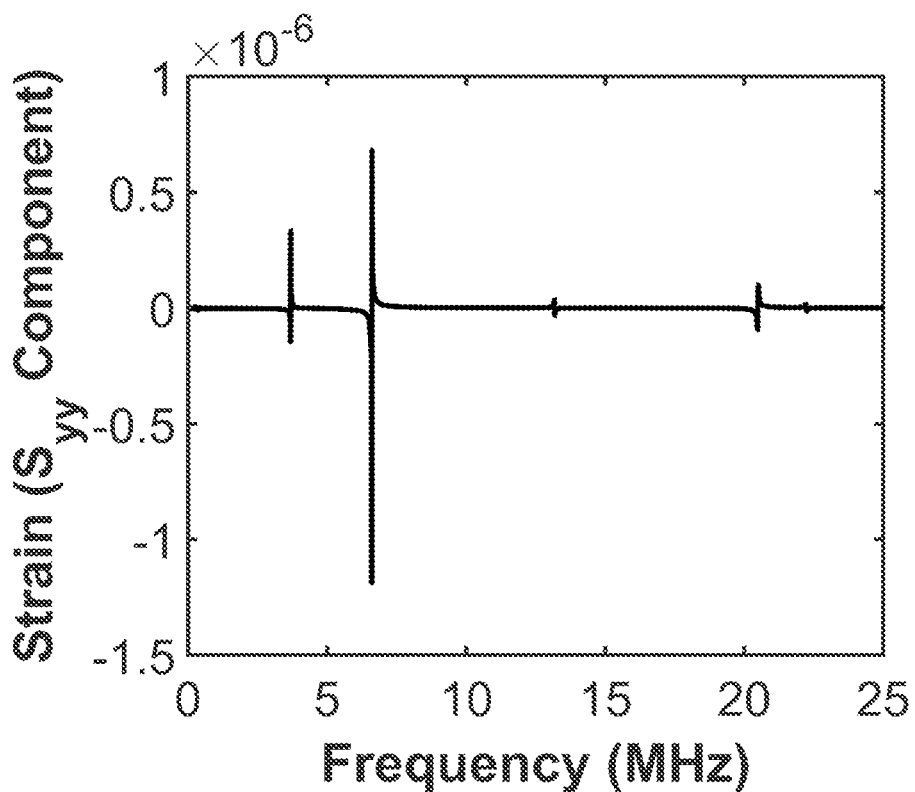
FIGS. 4A-B show volume average strain vs. frequency for the modulator element of FIG. 3B.
Figure 4B:
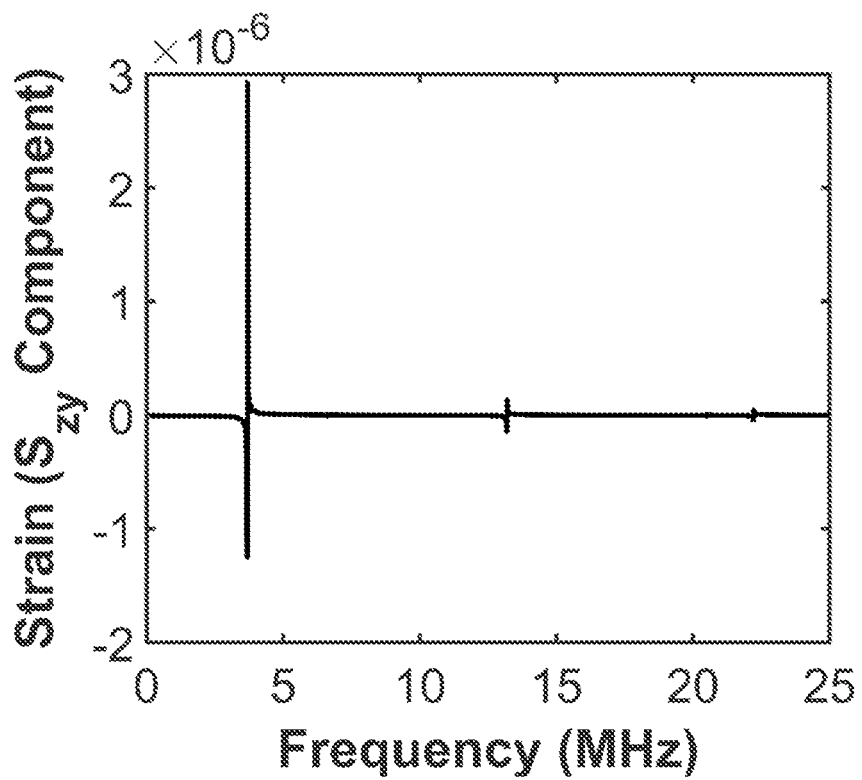
Figure 5A:
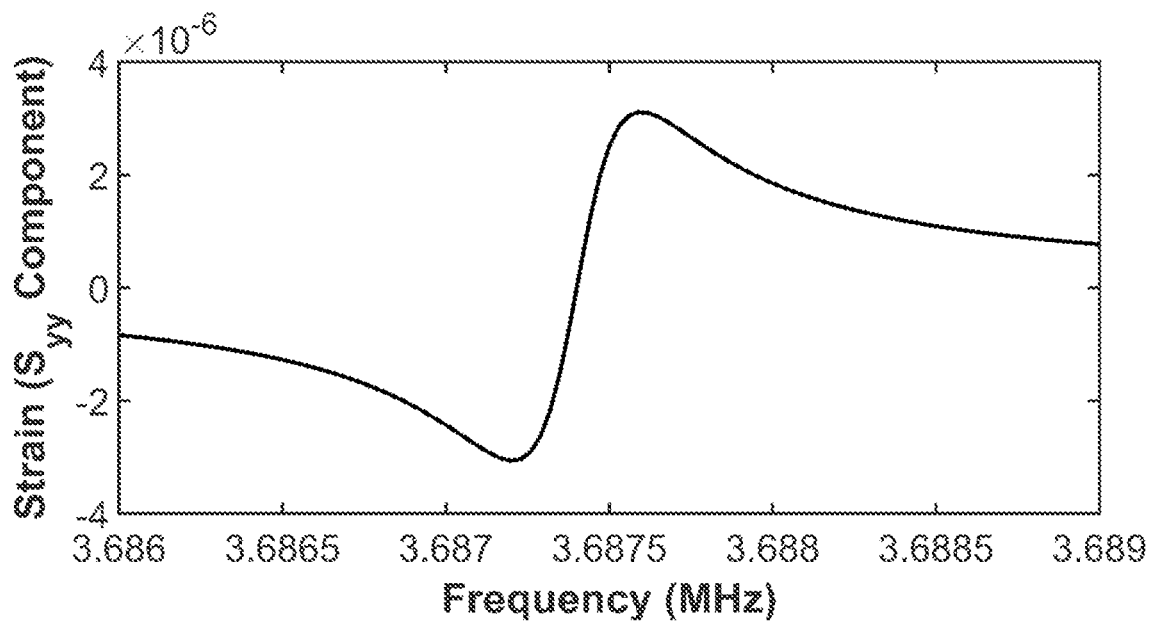
FIGS. 5A-B show the fundamental peaks of FIGS. 4A-B in higher frequency resolution.
Figure 5B:
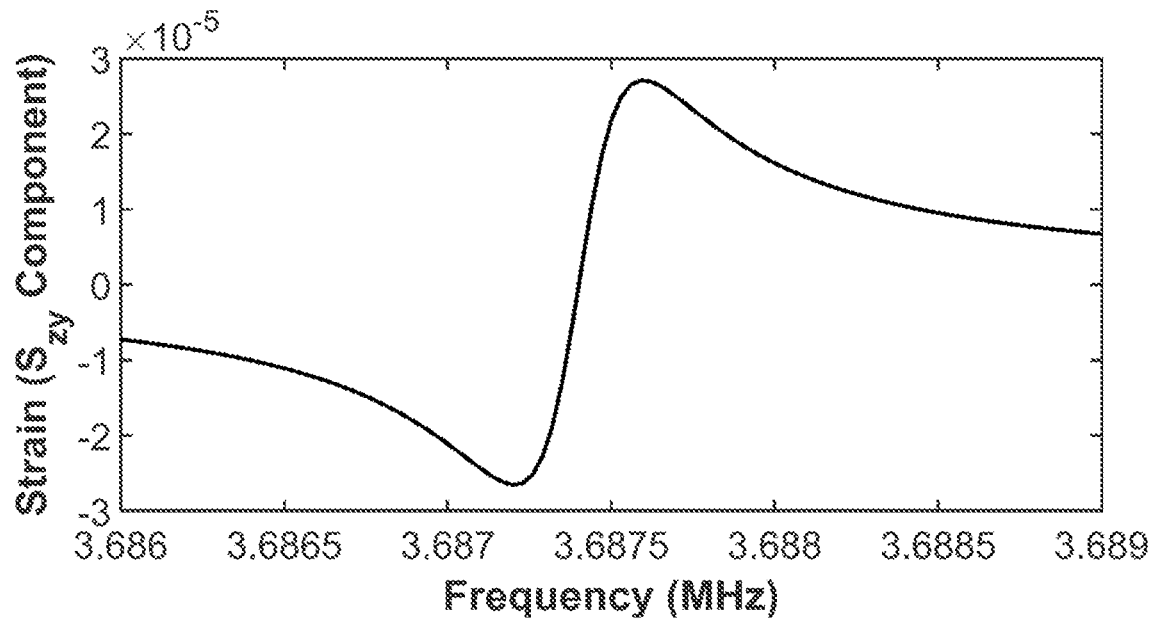

FIGS. 4A-B show the volume average of the strain components in the wafer $\bar{S}_{yy}$ (FIG. 4A) and $\bar{S}_{zy}$ (FIG. 4B) corresponding to the region covered with surface electrodes. We see resonances at multiple frequencies, but for the rest of this work we will be focusing on the resonance frequencies at the fundamental mechanical resonance frequency for the wafer at roughly 3.7 MHz and the resonance frequency at roughly 20.5 MHz. We first consider the fundamental mode at 3.7 MHz. The volume average for the $\bar{S}_{yy}$ (FIG. 5A) and $\bar{S}_{zy}$ (FIG. 5B) strain components around the fundamental mechanical resonance frequency inside the wafer are shown. If the wafer is driven at one of its mechanical resonance frequencies $f_i^*$, an acoustic standing wave forms inside the wafer. The standing wave causes the two strain components contributing to polarization modulation $\bar{S}_{yy}$ and $\bar{S}_{zy}$ to be in-phase or anti-phase. The volume average strain components can therefore be expressed as $\bar{S}_{yy}=A_1\cos(2\pi f_i^* t)$ and $\bar{S}_{zy}=A_2\cos(2\pi f_i^* t)$. The modified index ellipsoid in this case can be expressed as in Eq. (7).

$$x^2\left(\frac{1}{n_0^2} + p_{12}A_1\cos(2\pi f_i^* t) + 2p_{14}A_2\cos(2\pi f_i^* t)\right) + y'^2\left(\frac{1}{n_0^2} + p_{11}A_1\cos(2\pi f_i^* t) - 2p_{14}A_2\cos(2\pi f_i^* t)\right) + z'^2\left(\frac{1}{n_e^2} + p_{13}A_1\cos(2\pi f_i^* t)\right) = 1 \quad (7)$$

B2a) Normal Incidence

In this section, the polarization modulation $\Delta\varphi(t)$ as a function of time will be derived assuming the incoming beam is perpendicular to the wafer (actually at an angle $\theta$ to the normal of the wafer) and the wafer is driven at its fundamental mechanical resonance frequency of $f_i^*$. Another lithium niobate wafer parallel and rotated in plane by 90° is placed before the photoelastic modulator to correct for static polarization rotation of light. The incoming beam sees the refractive indices $n_{z'}(t)$ and $n_x(t)$ when passing through the photoelastic modulator, where refractive index along the x and z' directions are modulated by the photoelastic effect as in Eq. (7) and the coordinate system with respect to the crystal orientation is used.

$$n_x(t) = \frac{n_0}{\sqrt{1 + n_0^2(p_{12}A_1\cos(2\pi f_i^* t) + 2p_{14}A_2\cos(2\pi f_i^* t))}} \quad (8)$$

Since $n_o^2(p_{12}A_1\cos(2\pi f_i^* t) + 2p_{14}A_2\cos(2\pi f_i^* t))\ll 1$, we can approximate Eq. (8) as shown in Eq. (9).

$$n_x(t) \approx n_0 - n_0^3\left(\frac{1}{2}p_{12}A_1 + p_{14}A_2\right)\cos(2\pi f_i^* t) \quad (9)$$

$$n_{z'}(t) = \frac{n_e}{\sqrt{1 + n_e^2 p_{13}A_1\cos(2\pi f_i^* t)}} \quad (10)$$

$$n_{z'}(t) \approx n_e - \frac{1}{2}n_e^3 p_{13}A_1\cos(2\pi f_i^* t) \quad (11)$$

The change in the in-plane refractive indices $\Delta n(t)$ is expressed in Eq. (12).

$$\Delta n(t) = (n_0 - n_e) - (n_x(t) - n_{z'}(t)) = (n_0^3(\tfrac{1}{2}p_{12}A_1 + p_{14}A_2) - \tfrac{1}{2}n_e^3 p_{13}A_1)\cos(2\pi f_i^* t) \quad (12)$$

The phase difference between the two in-plane electric field components (crystal x and z' directions) of light with wavelength λ after passing through the wafer of thickness L changes according to Eq. (13).

$$\Delta\phi(t) = \frac{2\pi}{\lambda}\Delta n(t)L \tag{13}$$

The acceptance angle for this system can be calculated by finding the largest incoming angle with respect to the wafer normal, such that the static birefringence between the ordinary and extraordinary rays is 45°. The acceptance angle in this case is approximately equal to $2\theta_{max}$, where $\theta_{max}$ is the largest θ satisfying the expression in Eq. 14. The variables used in Eq. 14 are defined in Eqs. 15-17 to have a simplified expression in Eq. 14, where $\theta_r$ is the refraction angle for a wave that is traveling perpendicular to the optic axis of the lithium niobate wafer and with electric field parallel to the optic axis of lithium niobate. Similarly, $\theta_e$ is the refraction angle for the extraordinary wave with corresponding refractive index n(ee), where the propagation direction is not parallel nor perpendicular to the optic axis of lithium niobate. Using a wafer thickness of 0.5 mm (the thickness used in experiment), the acceptance angle is roughly 20°. A thinner wafer can be used to increase the acceptance angle. For example, a wafer thickness of 0.1 mm has an acceptance angle of approximately 50°, but the wafer has different mechanical resonance frequencies.

$$\frac{2\pi L}{\lambda}(n(\theta_e) - n_e)\left(\frac{1}{\cos(\theta_e)} - \frac{1}{\cos(\theta_r)}\right) < \frac{\pi}{4} \tag{14}$$

$$\theta_e = \sin^{-1}\left(\frac{n_0\sin(\theta)}{\sqrt{n_0^2 n_e^2 - (n_e^2 - n_0^2\sin^2(\theta))}}\right) \tag{15}$$

$$\cos(\theta_r) = \sqrt{1 - \frac{\sin^2(\theta)}{n_e^2}} \tag{16}$$

$$\frac{1}{n^2(\theta_e)} = \frac{\cos^2(\theta_e)}{n_0^2} + \frac{\sin^2(\theta_e)}{n_e^2} \tag{17}$$

B2a1) Depth of Polarization Modulation

In this section, the relationship between the depth of polarization modulation D as a function of the applied peak-to-peak voltage $V_p$ to the photoelastic modulator and the quality factor (Q) of the fundamental mechanical resonance mode of the wafer will be derived. We calculate the depth of polarization modulation assuming normal incidence of light to the lithium niobate wafer at the fundamental mechanical resonance frequency for the wafer. We calculate the volume average for the two strain components ($S_{yy}$ and $S_{zy}$) contributing to polarization modulation in the sample using COMSOL.

Loss is added in simulation to the system by making the density of lithium niobate material complex. Since the photoelastic effect is in the linear regime for weak driving, using the added loss component to the material allows the clamping loss effect to be taken into account. The simulation with the added loss is used to determine the strain components and therefore the depth of modulation at a given mechanical Q and voltage applied to the electrodes. In the linear regime for the photoelastic effect, the depth of polarization modulation is proportional to $V_p$ and Q. To determine the proportionality constant, relating D to $V_p$ and Q, a known peak-to-peak voltage is applied to a lithium niobate wafer with known mechanical Q at the driving frequency.

In simulation, we apply 2 V peak-to-peak to the electrodes at around the fundamental mechanical resonance frequency for the wafer (approximately 3.7 MHz). From COMSOL simulations in FIGS. 5A-B, we see that the volume averages at the resonance are roughly $A_1=3\times10^{-6}$ and $A_2=2\times10^{-5}$. Using the photoelastic constants $p_{12}=0.06$, $p_{13}=0.172$, and $p_{14}=-0.052$ from the literature with Eqs. 12-13, the depth of polarization modulation is calculated to be 0.0715 radians for light of wavelength 630 nm. The Q for the wafer in the simulation with the added loss is roughly 9000 (calculated based on 3 dB cutoff points for the strain around the fundamental mechanical resonance frequency). Based on these results, and using the linearity of the photoelastic effect in the weak driving regime, the depth of polarization modulation D for an incident beam along the y direction of the wafer can be calculated roughly as in Eq. 18 for light of wavelength 630 nm:

$$D = \left(n_0^3\left(\frac{1}{2}p_{12}A_1 + p_{14}A_2\right) - \frac{1}{2}n_e^3 p_{13}A_1\right)\frac{2\pi}{\lambda}L \tag{18}$$

The depth of polarization modulation is independent of wafer thickness L to first order. The amplitude E of the electric field generated inside the wafer by the surface electrodes is inversely proportional to wafer thickness, but this is compensated by the larger path traversed by the light when passing through the wafer.

In the previous sections, the polarization change of light was calculated using the photoelastic effect. The linear electro-optic effect can also modulate the polarization of light in lithium niobate. The phase difference between the two in-plane electric field components (crystal x and z' directions) of light is modulated by the electro-optic effect, which is expressed in Eq. 20. The difference between the in-plane refractive indices of the lithium niobate wafer is modulated at the applied frequency to the surface electrodes. The modulation amplitude is expressed in Eq. 19 using the linear electro-optic effect with $r_{22}=6.7\times10^{-12}$ m/V:

$$\Delta n_{eo} \approx 0.5 E n_0^3 r_{22} \tag{19}$$

$$\Delta\phi_{eo} = \frac{2\pi}{\lambda}\Delta n_{eo}L \tag{20}$$

The electro-optic effect is negligible compared to the photoelastic effect due to the high mechanical resonance exhibited by the wafer (Q≈9000). The photoelastic effect with mechanical Q=9000 is approximately two orders of magnitude more effective in modulating the in-plane refractive indices compared with the electro-optic effect. Therefore the electro-optic effect will not be included in the polarization modulation calculations.

B3) Polarization Modulation Conversion to Intensity Modulation

Polarization modulation can be converted into intensity modulation by sandwiching the photoelastic modulator between two polarizers. Malus' law governs the transmitted intensity of light after passing through a polarizer: the transmitted intensity of light after passing through a polarizer is scaled by cosine squared of the angle between the polarization direction of light and the transmission axis of the polarizer. Since standard polarizers have high extinction ratios, high modulation depth can be realized.

When the lithium niobate wafer is driven near its resonance mode(s), the intensity modulation is a cosine inside a cosine (similar to frequency modulation). This expression can be expanded by the Jacobi-Anger expansion, causing an infinite number of equally spaced frequencies.

For each intensity modulation frequency, the fundamental tone is downconverted into the bandwidth of the image sensor, and the fundamental tone is used for signal processing; the other tones are low-pass filtered by the image sensor.

The scene is illuminated with intensity modulated light $l(t)$ with intensity $I_0$ at frequencies $f_1, f_2, \ldots, f_n$, expressed in Eq. 21. The frequencies $f_1, f_2, \ldots, f_n$ are slightly detuned from the frequencies used to drive the photoelastic modulator $f_1^*, f_2^*, \ldots, f_n^*$. The light reflected from location $(x_k, y_l)$ with reflectivity $r(x_k, y_l)$ in the scene is represented as $s(t, x_k, y_l)$ and assumed to be unpolarized, which is Doppler shifted by $\Delta f_1, \Delta f_2, \ldots, \Delta f_n$ and phase shifted by $\psi_1, \psi_2, \ldots, \psi_n$, as shown in Eq. 22. The received heterodyne beat signal $\hat{f}_i$ at image sensor pixel $(k,l)$ corresponding to scene location $(x_k, y_l)$ is represented as $p(t, x_k, y_l)$, which carries the phase and Doppler information at a frequency (~Hz) and falls within the bandwidth of the image sensor. After manipulating Malus' law, $p(t, x_k, y_l)$ can be expressed as in Eq. 23, which represents the multiple beat frequencies detected by a single image sensor pixel. $\phi(t)$ is the phase difference between the two in-plane polarization directions of light (x and z' directions with respect to the crystal) that has passed through the corrective lithium niobate wafer and the photoelastic modulator, which is expressed in Eq. 24. Also, $\phi(t)=\Delta\phi(t)+\phi_0$, where $\Delta\phi(t)$ is expressed in Eq. 13, and $\phi_0$ is the static phase difference between the in-plane polarization directions. The angle between the polarization axis of the second polarizer (element 314 in FIG. 3A) and the optic axis of the photoelastic modulator 312 is $\theta_0$.

$$\psi_i = \frac{4\pi f_i}{c} d(x_k, y_l)$$

is the phase shift at the receiver of the intensity-modulated light that illuminates the scene, where $d(x_k, y_l)$ is the distance of the receiver to the scene location and c the speed of light in the scene.

$$\Delta f_i = \frac{2v(x_k, y_l) f_i}{c}$$

is the Doppler shift for the received light due to motion with velocity $v(x_k, y_l)$ in the scene location $(x_k, y_l)$. The distance and velocity of each point in the scene can be efficiently computed by performing a fast Fourier transform (FFT) with respect to time per image sensor pixel and using the phase and frequency shift information.

$$I(t) = I_0 \Sigma_{i=1}^n \cos(2\pi f_i t) \quad (21)$$

$$s(t, x_k, y_l) = r(x_k, y_l) I_0 \Sigma_{i=1}^n \cos(2\pi (f_i + \Delta f_i) t + \psi_i) \quad (22)$$

$$p(t, k, l) = s(t, x_k, y_l) \frac{1}{4} \sin(2\theta_0) \cos(\phi(t)) \quad (23)$$

$$\phi(t) = D \Sigma_{i=1}^n \cos(2\pi f_i^* t) + \phi_0 \quad (24)$$

Due to optical mixing, which takes place in Eq. 23, many tones are generated. The beat term that falls within the bandwidth of the image sensor is shown in Eq. 25, with $\hat{f}_i = f_i + \Delta f_i - f_i^*$ and $I(x_k, y_l) = -\frac{1}{2} I_0 r(x_k, y_l)$:

$$p(t, k, l) \approx (x_k, y_l) J_0^{n-1}(D) J_1(D) \sin(\phi_0 \sin(2\theta_0) \Sigma_{i=1}^n \cos(2\pi \hat{f}_i t + \psi_i) \quad (25)$$

Optimum depth of modulation can be calculated by optimizing $J_0^{n-1}(D) J_1(D) \sin(\phi_0) \sin(2\theta_0)$, assuming the depth of polarization modulation D is the same for all frequencies $f_i^*$. The $\sin(2\theta_0)$ term is maximized when $\theta_0 = 45°$, suggesting that the two polarizer transmission axes should be parallel or perpendicular. The $\sin(\phi_0)$ term is maximized when $\phi_0 = 90°$, suggesting that the static polarization should be circularly polarized light. In other words, if the modulation signal to the photoelastic modulator is turned off, the outcoming beam before passing through the second polarizer should be circularly polarized light.

Figure 6:
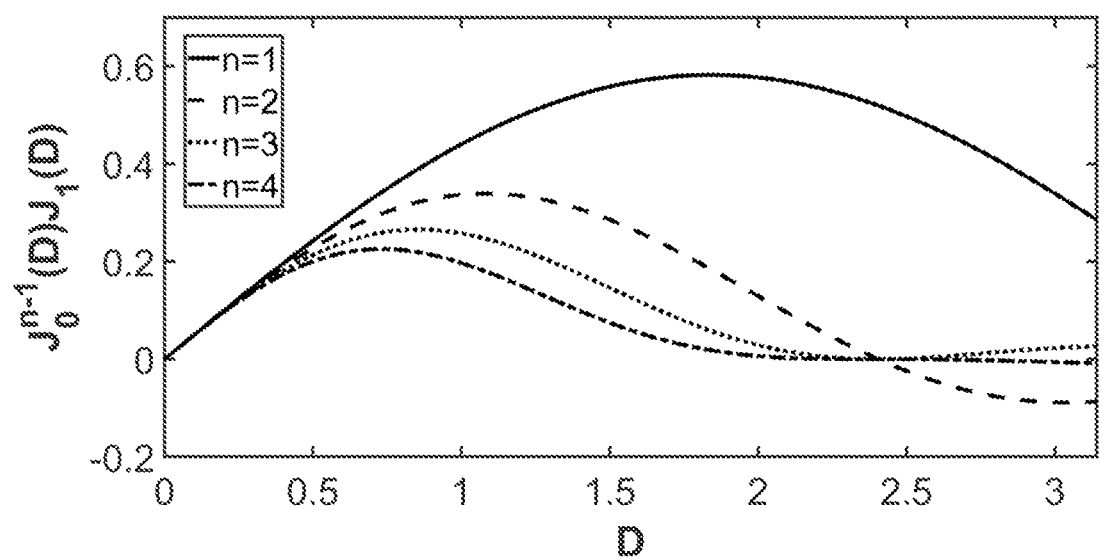
FIG. 6 shows intensity modulation depth as a function of phase modulation.

FIG. 6 shows the depth of modulation for different D values and number of frequencies n used to drive the photoelastic modulator. The intensity modulation depth drops as the number of frequencies used to drive the photoelastic modulator is increased. Since the wafer is multi-moded and multiples of these modes are driven with the source, many mixing terms appear in the spectrum, reducing the depth of modulation. The intensity modulation frequencies for the illumination light $f_1, f_2, \ldots, f_n$ and the mechanical resonance frequencies used for the wafer $f_1^*, f_2^*, \ldots, f_n^*$ should be selected such that the only beat tones falling within the temporal bandwidth of the image sensor are $\hat{f}_1, \hat{f}_2, \ldots, \hat{f}_n$. Additionally, the polarization modulation depth for higher-order mechanical modes is smaller compared to lower-order modes. An alternative to using a single wafer driven at multiples of its resonance frequencies is to have wafers of different thicknesses that are placed in front of and parallel to each other. Each wafer can then be driven at its fundamental mechanical resonance frequency, or possibly by driving another higher-order mode.

B4) Multi-Frequency Operation to Extend Unambiguous Range

Using a single frequency for distance measurements limits the unambiguous range or the depth resolution. When using a single frequency, which refers to the intensity modulation frequency, the unambiguous range is limited to half the wavelength $$\frac{c}{2f_i}$$

corresponding to the frequency used.

Using a low frequency results in a large unambiguous range, but the estimated phase needs to be accurate, since the calculated distance is directly proportional to the measured phase. Even small phase errors due to shot noise or electronic noise will lead to significant distance errors, which necessitates using megahertz frequencies. If a single frequency is used, and the range is limited to $$0 \leq d(x_k, y_l) < \frac{c}{2f_i},$$

the measured phase for the beat tone $\psi_i \in [0, 2\pi)$ is used as in Eq. 26 to estimate the distance $d(x_k, y_l)$ corresponding to image sensor pixel (k,l):

$$d^*(x_k, y_l) = \frac{\varphi_i c}{4\pi f_i} \quad (26)$$

To significantly improve the unambiguous range while retaining the depth resolution, the phase of multiple frequencies can be used after the round-trip of light, similar to the operation of SFCW radar. The standard CMOS image sensor has high angular resolution due to the wavelength of light. We assume a single target per image sensor pixel due to the high angular resolution of the sensor. Therefore, the constraints that apply to SFCW radar do not apply for our system. This allows achieving high depth resolution and unambiguous range despite measuring the phase of the returned light at several discrete frequencies.

One common problem with flash lidars is multi-path interference (MPI), which corrupts phase estimates and therefore distance estimates. There are solutions to overcome MPI, some of which use the phase of multiple frequencies. In the rest of this work, we assume MPI has minimal impact on measurements, and we use the frequency support to extend the unambiguous range.

Standard ToF cameras measure the phase at each frequency using homodyne detection. In this section, we use multiple frequencies with heterodyne detection to simultaneously detect the phases corresponding to each intensity modulation frequency.

There are two problems that need to be addressed: the number of modulation frequencies to be used, and the reconstruction algorithm for estimating the distance and velocity per image sensor pixel. In this work, we focus on the reconstruction algorithm for distance, and leave the selection of the modulation frequencies and velocity estimation as future work.

We first solve the problem of finding an algorithm for distance reconstruction per sensor pixel (k,l) corresponding to location $(x_k, y_l)$ in the scene, assuming modulation frequencies $f_1, f_2, \ldots, f_n$ are used for illumination, and the phase response measured at each frequency using the optical mixer and an image sensor. Maximum likelihood detection is used for distance reconstruction per image sensor pixel to maximize the probability of correct detection.

Before using the forward reconstruction algorithm for estimating the distance, we need to accurately predict the phase of each frequency sampled by the image sensor. This is equivalent to estimating the complex gains of a noisy mixture of sinusoids, where the noise is white and follows a Gaussian distribution. The phases for the mixture of noisy sinusoids can be estimated efficiently via the Newtonized orthogonal matching pursuit (NOMP). Once the phases have been extracted, each phase can be modeled as a Gaussian distribution:

$$\psi_i^* \sim \mathcal{N}\left(\frac{4\pi d(x_k, y_l) f_i}{c} \mod(2\pi), \sigma^2\right),$$

with $d(x_k, y_l)$ the distance of the location in the scene $(x_k, y_l)$ to the receiver, c the speed of light in the scene, and $\sigma^2$ the noise variance. Due to $2\pi$ phase wrapping, even if multiple frequencies are used and perfect phase information is retrieved, there will always be an ambiguous range at the least common multiple of the wavelengths corresponding to the modulation frequencies. This presents an ill-posed optimization problem due to multiple solutions. As a way around this problem, we define an unambiguous range, which is smaller than the least common multiple of the modulation frequencies. In fact, this unambiguous range should be determined based on the signal-to-noise ratio (SNR) and the modulation frequencies, but that problem is not dealt with in this work.

We cast the distance estimation as an optimization problem, in which the most likely distance $d^*(x_k, y_l)$ to explain the observed phases within the selected unambiguous range is chosen as the distance estimate per image sensor pixel. If $\psi_i^*$ is the estimated phase corresponding to intensity modulation frequency $f_i$, $d_u$ is the selected unambiguous range, and $p_i$ is the probability density function of a Gaussian random variable, the optimization problem can be expressed as in Eq. (27):

$$\operatorname*{argmax}_{d(x_k, y_l)} \prod_{i=1}^{n} p_i\left(\psi_i^* = \frac{4\pi d(x_k, y_l) f_i}{c} (\mathrm{mod} 2\pi)\right) \quad (27)$$

subject to $0 \leq d \leq d_u$

This is a non-convex optimization problem due to phase wrapping. One possible approach to solve the optimization problem is by separating the optimization problem into bounded least squares problems through constraining the distance such that within each of the regions, the objective function is convex (possibly also with some approximations). The global maximum among the local maxima would then be equivalent to solving the non-convex optimization problem. We leave this approach as future work, and use a reconstruction algorithm based on forward reconstruction.

Taking the logarithm of Eq. 27, this problem is equivalent to Eq. 28, where k is a vector of integers to deal with phase wrapping:

$$\operatorname*{argmin}_{d(x_k, y_l), k} \sum_{i=1}^{n} \left(\psi_i^* = \frac{4\pi d(x_k, y_l) f_i}{c} (\mathrm{mod} 2\pi) + 2\pi k(i)\right)^2 \quad (28)$$

subject to $0 \leq d \leq d_u, k(i) \in \{-1, 0, 1\}$

We use forward reconstruction to estimate the distance $d(x_k, y_l)$ corresponding to image sensor pixel (k,l). Within the unambiguous range $d_u$, we discretize the region $[0, d_u)$ with resolution r. We evaluate the phase that would have been observed if there was no noise corrupting the measurements for each frequency $f_i$ with $$\psi_i = \frac{4\pi d_m(x_k, y_l) f_i}{c},$$

where $d_m(x_k, y_l) = r \times m$, $m \in \mathbb{N}$. The distance is estimated by minimizing the objective function in Eq. 28, and this procedure is applied for each image sensor pixel (k,l) to estimate the distance in the scene $d^*(x_k, y_l)$.

Figure 7A:
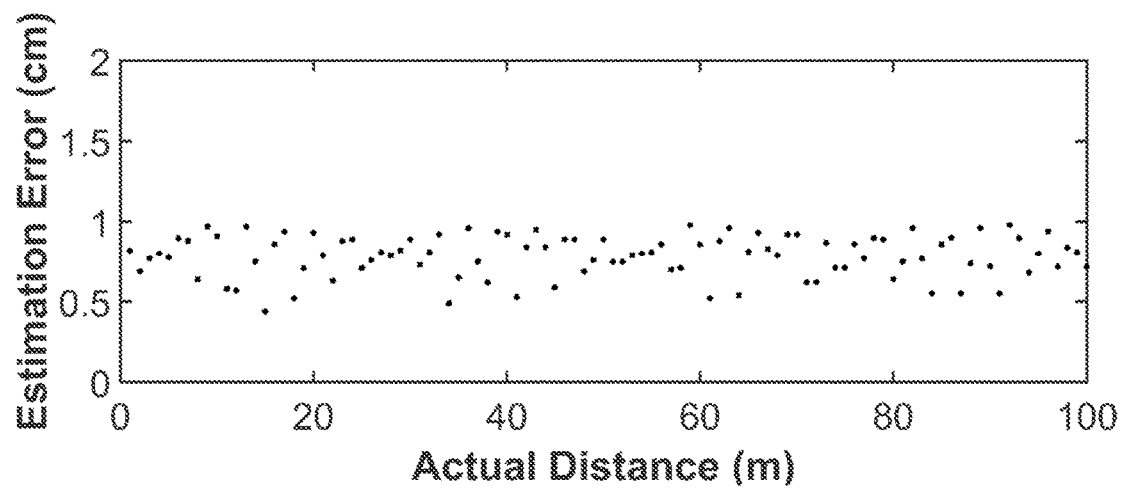
FIGS. 7A-C show simulation results for distance estimation error.
Figure 7B:
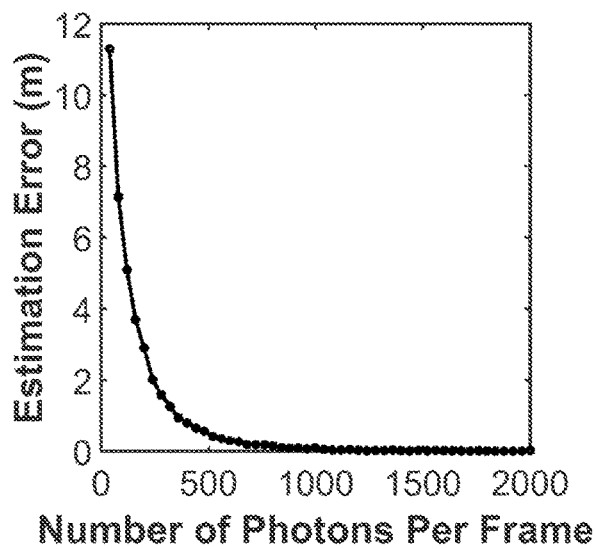
Figure 7C:
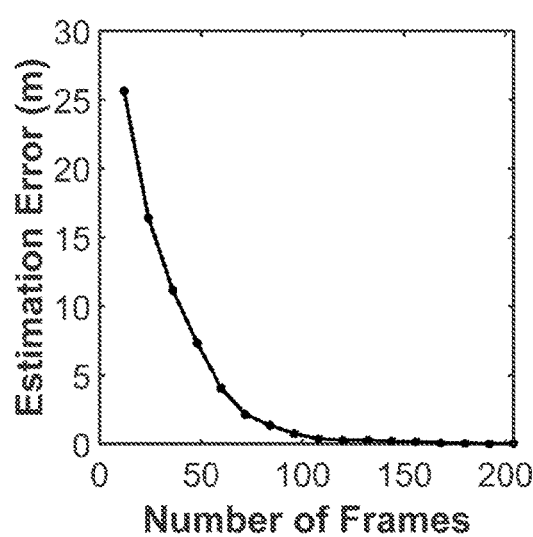

We simulate the performance of the distance estimation algorithm per image sensor pixel assuming an unambiguous range of 100 m, camera frame rate of 600 Hz, shot-noise limited measurements with three modulation frequencies used at 97.8 MHz, 19.59 MHz, and 4.02 MHz and beat tones appearing at 80 Hz, 170 Hz, and 250 Hz, respectively. The three modulation frequencies used in simulation correspond to the mechanical resonance frequencies of the tested lithium niobate wafer in experiment. The performance of the algorithm for these parameters and as a function of number of frames and the number of photons per frame per pixel is shown in FIGS. 7A-C. The average estimation error in the range (1-100) m using 2000 photons per pixel per frame and 200 frames used per distance estimate is around 0.8 cm. Velocity estimation in a scene is not considered in this work, but essentially the Doppler shift of the tones is used.

B5) Experiment

A Y-cut lithium niobate wafer of 0.5 mm thickness and 5.08 cm diameter is coated with aluminum wire grid on both surfaces with alignment to attain near uniform electric field inside the wafer (pointing along the y direction of the crystal) and to retain optical transparency. Photolithography with a lift-off process is used to deposit 100 nm thick aluminum grid wire on an area of 2.04 cm diameter and centered on both front and back sides of the wafer through back-side alignment. Each aluminum wire is 4 μm thick and separated by 40 μm. Wirebonding is used from the top and bottom electrode connections stretching from the center part coated with aluminum wire grid to the side of the wafer to connect to a printed circuit board (PCB) plane. The wafer is supported on the PCB through the use of three nylon washers that are equally separated and clamp the wafer from the sides. The washers hold the wafer through epoxy.

B5a) Mechanical Response

Figure 8A:
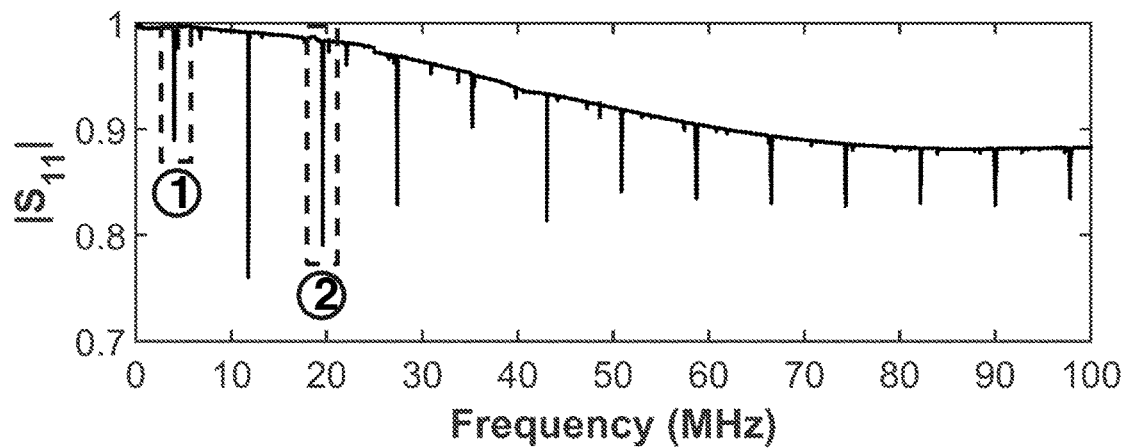
FIGS. 8A-C show the mechanical frequency response of the wafer of FIG. 3B.
Figure 8B:
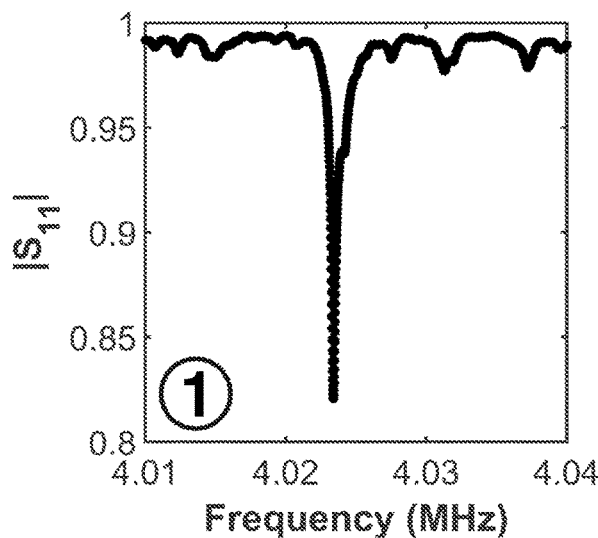
Figure 8C:
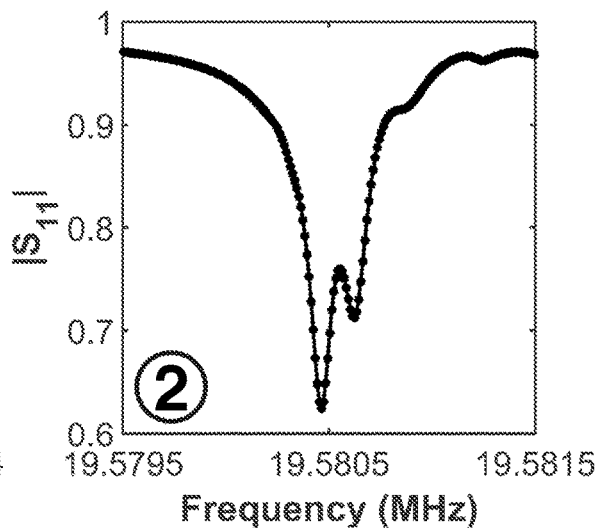

The mechanical response of the device is measured using a vector network analyzer (VNA). FIGS. 8A-C show the mechanical frequency response for the device (S11 parameter measured with respect to 50Ω). The fundamental mechanical resonance frequency shows up around 4.023400 MHz, and the other resonance modes are spaced by around 8 MHz, double the fundamental resonance frequency. The wafer supports modes up to 100 MHz, but the focus for the rest of this section will be on the fundamental mechanical resonance frequency at 4.023400 MHz and the higher-order mode at 19.580970 MHz. We know from COMSOL simulations in FIGS. 4A-B that these modes should have a net volume average for strain inside the wafer (corresponding to the COMSOL modes at 3.7 MHz and 20.5 MHz, respectively).

B5b) Optical Mixing

To observe optical mixing on the CMOS image sensor and downconvert megahertz-level intensity modulation frequencies to hertz range, we intensity modulate a light-emitting diode (LED) emitting light of wavelength 630 nm at a frequency slightly offset from the mechanical resonance frequency of the wafer. The light passes through the optical mixer, which includes the aluminum-deposited lithium niobate wafer. The system includes the intensity-modulated LED, polarizer, aluminum-deposited lithium niobate wafer (photoelastic modulator) driven at one or more resonance frequencies, a 90° rotated lithium niobate wafer, and another polarizer. We observe optical mixing at 4.023400 MHz when the wafer is driven at resonance and the LED is detuned in frequency by 100 Hz. We also observe mixing when the higher-order mode is driven at around 19.580970 MHz and the LED is detuned by 60 Hz. Multi-heterodyne detection is observed, in which these two tones are driven simultaneously and the beat tones placed at 60 Hz and 100 Hz, respectively. The mixing terms are shown in FIGS. 9A-D. These figures also shows that the photoelastic effect is what causes the optical mixing, because when the frequency supplied to the photoelastic modulator is swept around the fundamental mechanical resonance frequency (FIG. 9D), the beat tone signal level (appearing at 100 Hz) changes and shows a resonance behavior.

B5c) Analyzing Experimental Results

Figure 9A:
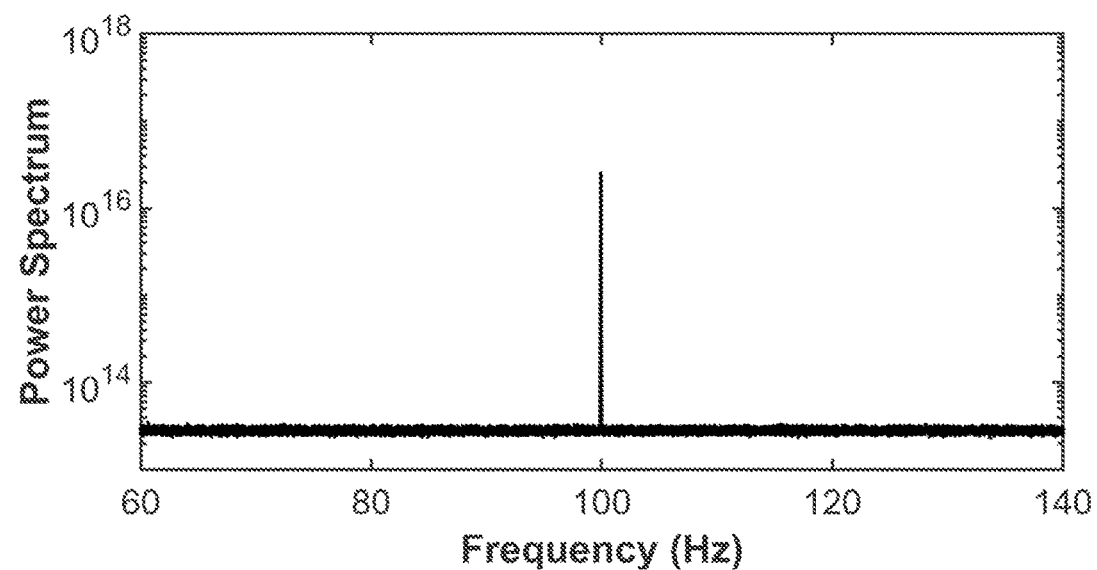
FIGS. 9A-D show measured heterodyne detection results.
Figure 9B:
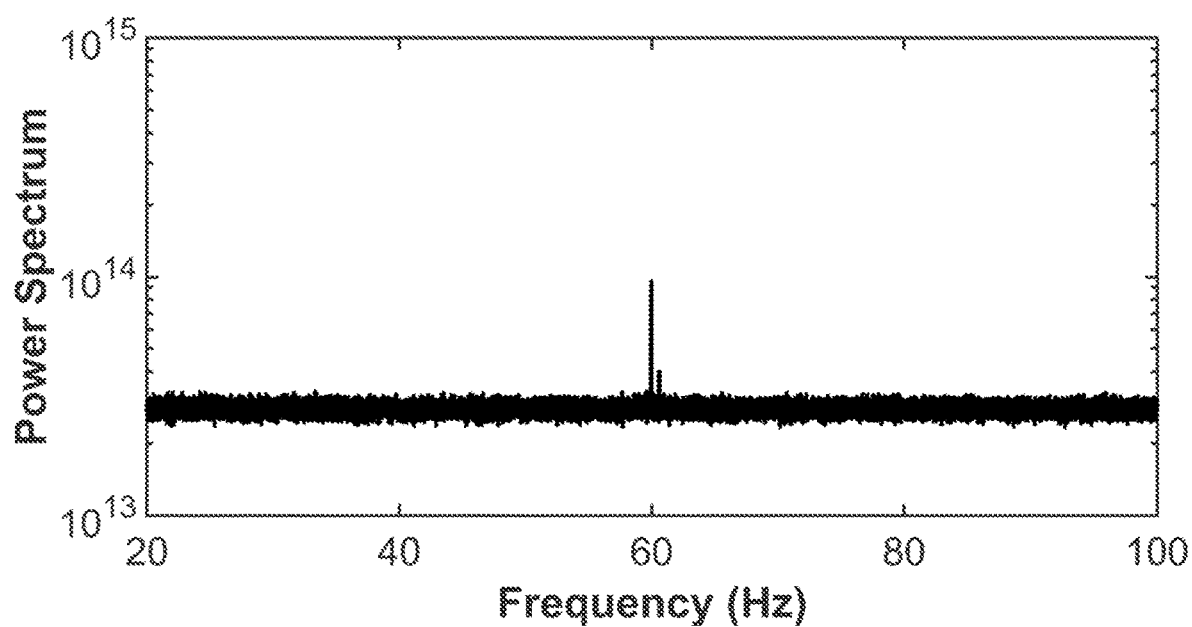
Figure 9C:
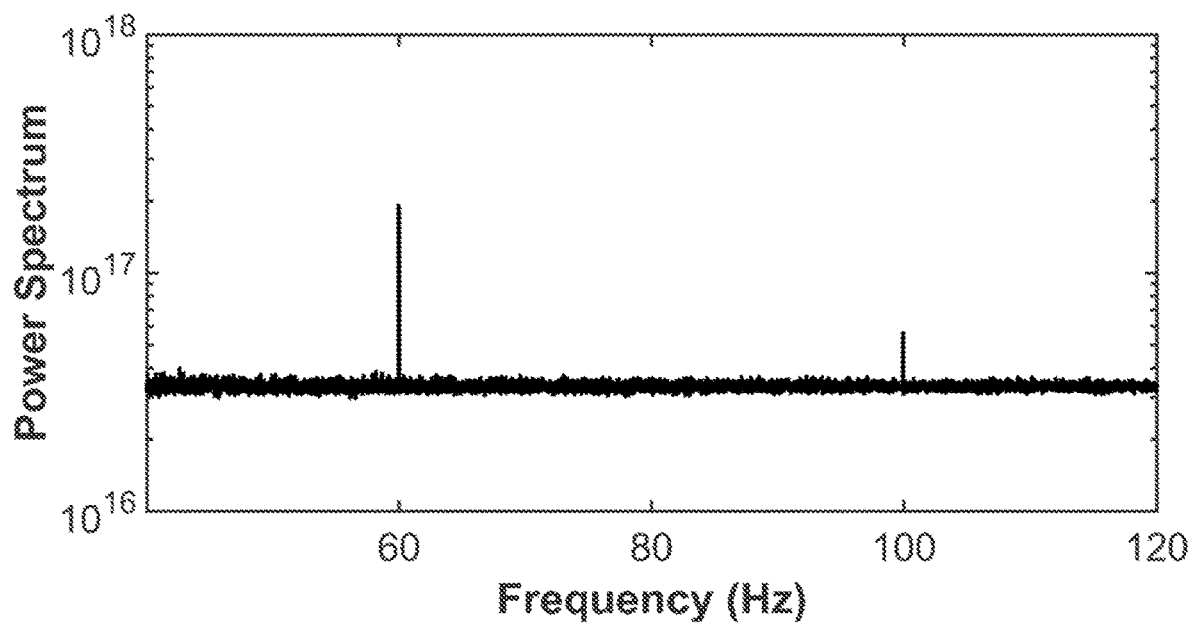
Figure 9D:
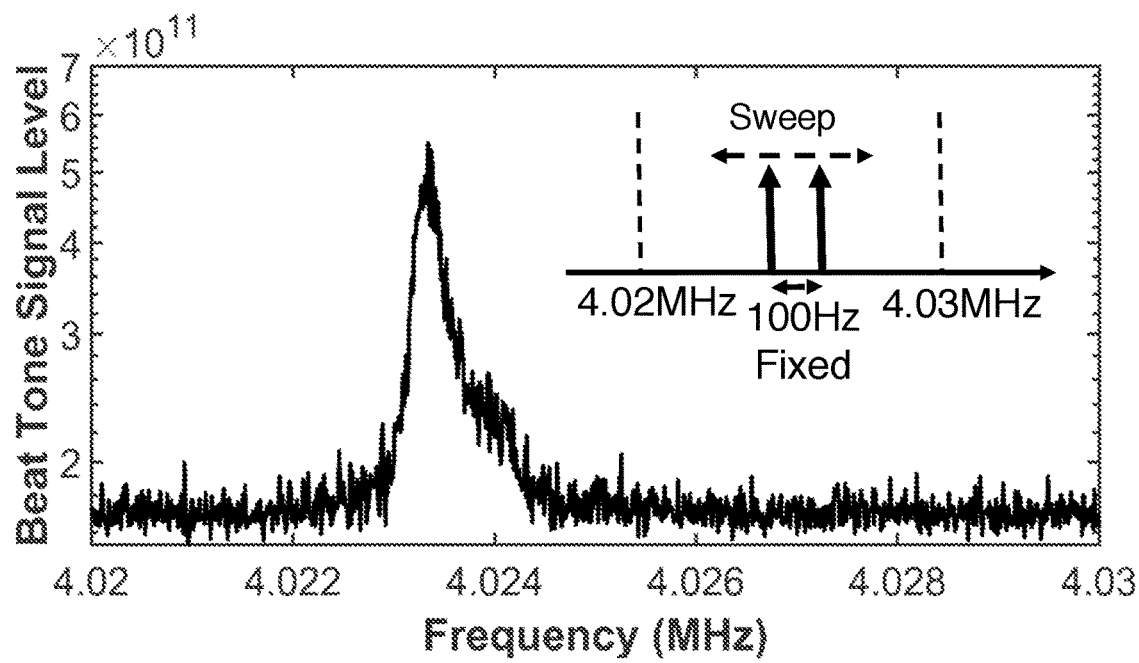

The depth of intensity modulation is 0.1% when 20 V peak-to-peak is applied to the wafer. The fundamental mechanical mode at 4.023400 MHz has a Q of roughly 11,000. The depth of modulation for the LED is 12%. Using Eqs. 18 and 25, the expected depth of modulation can be calculated as 1.75%. FIGS. 9A-D show the detected beat tones with the CMOS camera. In FIG. 9A, the wafer is driven at its fundamental mechanical resonance frequency at 4.023400 MHz, and the LED intensity modulation frequency is offset by 100 Hz from 4.023400 MHz. The beat signal at 100 Hz is visible after plotting the power spectrum. In FIG. 9B, the wafer is driven at its higher order mode at 19.580970 MHz, and the intensity modulation for the LED is offset by 60 Hz from 19.580970 MHz. The beat signal at 60 Hz is visible after plotting the power spectrum. In FIG. 9C, 4.023527 MHz and 19.589670 MHz are used simultaneously to drive the wafer, and the LED intensity modulation frequencies are 4.023587 MHz and 19.589770 MHz with the beat signals occurring at 60 Hz and 100 Hz, respectively. 100,000 image sensor pixels are spatially averaged to improve the SNR. In FIG. 9D, the frequency difference between the LED and the photoelastic modulator is fixed at 100 Hz, and both frequencies are swept around the fundamental mechanical resonance frequency from 4.02 MHz to 4.03 MHz. The beat signal level appearing at 100 Hz is plotted, which shows that the photoelastic effect is dominant over the electro-optic effect, since resonance behavior is observed.

The discrepancy between the expected and measured depth of modulation could be due to the misalignment between the wafers (leading to constructive and destructive interferences as a result of static polarization). Another possible source could be the operation of the photoelastic modulator as an open-loop system. Since the fundamental mechanical mode has a high Q, to achieve high modulation depth, the device needs to be operated at resonance, and even small frequency drifts in the fundamental mode should be tracked with a closed-loop system (e.g., phase-locked loop).

The observed optical mixing shows that the photoelastic modulator is a promising optical mixer. Depth of modulation can be improved through closed-loop driving to track any resonance drifts, aligning the optical components and refabricating the device to attain higher mechanical Q.

B6) Conclusion

The working principle of a prototype phase-shift-based ToF imaging system using an optical mixer, including a photoelastic modulator sandwiched between polarizers, and placed in front of a standard CMOS image sensor is demonstrated. The photoelastic modulator is a Y-cut lithium niobate wafer, which has a thickness of 0.5 mm and a diameter of 5.08 cm. The photoelastic modulator is significantly more efficient than an electro-optic modulator for polarization modulation owing to the high mechanical Q and the strong piezoelectricity and photoelasticity of lithium niobate. The working principle of the system, including polarization modulation through the resonant photoelastic effect, converting polarization modulation to intensity modulation, and multi-frequency operation by simultaneously driving the photoelastic modulator at multiples of its mechanical resonance frequencies are demonstrated. We have demonstrated that with the addition of a cost-effective, compact optical mixer, a standard image sensor can function as a high-resolution flash lidar system.

The invention claimed is:

1. An optical modulator comprising:
   a photoelastic material configured as a photoelastic window having a thickness d separating first and second window surfaces, and having lateral dimensions substantially greater than d;
   at least one acoustic excitation structure disposed on the first and/or second window surfaces;
   a controller connected to the at least one acoustic excitation structure and configured to excite one or more acoustic resonances having resonant frequencies determined by d;
   wherein an optical path through the photoelastic window is substantially perpendicular to the first and second window surfaces;
   wherein light passing through the photoelastic window and propagating substantially along the optical path experiences a time-varying birefringence responsive to excitation of the one or more acoustic resonances to provide polarization-modulated output light;
   wherein light passing through the photoelastic window and propagating along the optical path experiences isotropic propagation in the absence of any acoustic excitation.

2. The optical modulator of claim 1, further comprising an output polarizer configured to convert the polarization-modulated output light into intensity modulated output light.

3. A system for providing simultaneous optical distance and/or speed measurements of at least one target, the system comprising:
   an optical source having a source wavelength and configured to illuminate the at least one target with source light that is intensity modulated at one or more source modulation frequencies $f_i$;
   an imaging detector array;
   optics configured to form an image of the at least one target on the imaging detector array;
   a receiver modulator comprising
   a) one or more optical modulators each comprising:
      a photoelastic material configured as a photoelastic window having a thickness d separating first and second window surfaces, and having lateral dimensions substantially greater than d;
      at least one acoustic excitation structure disposed on the first and/or second window surfaces;
      a controller connected to the at least one acoustic excitation structure and configured to excite one or more acoustic resonances having resonant frequencies determined by d;
      wherein an optical path through the photoelastic window is substantially perpendicular to the first and second window surfaces;
      wherein light passing through the photoelastic window and propagating substantially along the optical path experiences a time-varying birefringence responsive to excitation of the one or more acoustic resonances to provide polarization-modulated output light, and disposed in front of the imaging detector array and
   b) an output polarizer configured to convert the polarization-modulated output light into intensity modulated output light;
      wherein the one or more optical modulators are modulated at one or more receiver modulation frequencies $f_j^*$;
      wherein the imaging detector array has an electrical bandwidth B such that the imaging detector array is non-responsive to signals having frequency greater than B;
      wherein the source modulation frequencies and the receiver modulation frequencies are selected such that each source modulation frequency has a corresponding receiver modulation frequency for i=j;
      wherein modulation cross terms for i=j have distinguishable frequencies less than B, and wherein modulation cross terms for i≠j have frequencies greater than B; and
      wherein each receiver modulation frequency $f_j^*$ also has a corresponding acoustic resonance $a_j$.

4. The system of claim 3, further comprising a processor configured to determine distance and/or speed of the at least one target from analysis of received Doppler frequency shifts and/or phase shifts of modulation envelopes at one or more beat frequencies $|f_i-f_i^*|$ of the intensity modulated output light.

5. The system of claim 4, wherein distance and/or speed can be determined individually for one or more pixels of the imaging detector array.

6. The system of claim 3, further comprising a bandpass spectral filter configured to selectively pass light having the source wavelength and disposed to filter the image.

7. The optical modulator of claim 1, further comprising an input polarizer configured to provide an input state of polarization to the photoelastic window that substantially equally excites two polarization modes of the photoelastic window.

8. The optical modulator of claim 1, wherein light passing through the photoelastic window and propagating along the optical path experiences a static birefringence in the absence of any acoustic excitation.

9. The optical modulator of claim 8, further comprising a compensating window disposed parallel to the photoelastic window, wherein the photoelastic window has a first retardance, wherein the compensating window has a second retardance, and wherein a net retardance provided by the first retardance and the second retardance is substantially 90 degrees.

10. The optical modulator of claim 1, further comprising a compensating window disposed parallel to the photoelastic window, wherein the compensating window has a retardance of substantially 90 degrees.

11. The optical modulator of claim 1, wherein the photoelastic window is also piezoelectric, and wherein the at least one acoustic excitation structure comprises a first electrode disposed on the first window surface and a second electrode disposed on the second window surface, and wherein the first and second electrodes are configured to excite the acoustic resonances via the piezoelectric effect in the photoelastic window.

12. The optical modulator of claim 1, wherein the photoelastic window is not piezoelectric, and wherein the at least one acoustic excitation structure comprises one or more acoustic transducers configured to excite the acoustic resonances.

13. The optical modulator of claim 1, wherein the at least one acoustic excitation structure is transparent.

14. The optical modulator of claim 1, wherein the photoelastic material comprises lithium niobate.

15. The optical modulator of claim 1, wherein the photoelastic material is mechanically anisotropic.

16. The optical modulator of claim 1, wherein a crystal family of the photoelastic material is selected from the group consisting of: triclinic, monoclinic, orthorhombic, tetragonal and hexagonal.

17. The optical modulator of claim 1, further comprising an anti-reflection coating disposed on at least one of the first and second window surfaces.

18. The optical modulator of claim 1, wherein at least one of the first and second window surfaces is curved to enhance the one or more acoustic resonances.

\* \* \* \* \*